United States Patent
Takekoh et al.

(12) 
(10) Patent No.: US 6,205,114 B1
(45) Date of Patent: Mar. 20, 2001

(54) CARTRIDGE CASE FOR A DISK-SHAPED RECORDING MEDIUM WITH PARTICULAR LID CONFIGURATION

(75) Inventors: Osamu Takekoh; Hiroshi Kishida, both of Tokyo (JP)

(73) Assignees: Dai Nippon Printing Co., Ltd., Tokyo; Pioneer Video Corporation, Yamanashi-Ken; Pioneer Electronic Corporation, Tokyo, all of (JP)

( * ) Notice: Subject to any disclaimer, the term of this patent is extended or adjusted under 35 U.S.C. 154(b) by 0 days.

(21) Appl. No.: 08/958,341

(22) Filed: Oct. 27, 1997

(30) Foreign Application Priority Data

| Oct. 28, 1996 | (JP) | 8-285382 |
| Apr. 9, 1997 | (JP) | 9-090386 |
| Apr. 18, 1997 | (JP) | 9-101219 |
| May 30, 1997 | (JP) | 9-141646 |

(51) Int. Cl.[7] .................................................. G11B 23/03
(52) U.S. Cl. ........................................... 369/291; 360/133
(58) Field of Search .................. 360/133; 369/289–291; 206/308.1, 308.3

(56) References Cited

U.S. PATENT DOCUMENTS

| 4,905,217 | * | 2/1990 | King et al. | 369/291 |
| 4,926,411 | * | 5/1990 | Ouwerkerk et al. | 369/291 |
| 5,048,008 | * | 9/1991 | Haruna | 369/291 |
| 5,093,823 | * | 3/1992 | Ouwerkerk et al. | 369/291 |
| 5,293,293 | * | 3/1994 | Iwata et al. | 360/133 |
| 5,526,337 | * | 6/1996 | Housey et al. | 369/291 |
| 5,682,286 | * | 10/1997 | Mizuta | 360/133 |
| 5,764,622 | * | 6/1998 | Kawamura et al. | 369/291 |
| 5,793,742 | * | 8/1998 | Sandell et al. | 369/291 |
| 5,796,713 | * | 8/1998 | Tanaka | 369/291 |
| 5,825,747 | * | 10/1998 | Tanaka | 369/291 |
| 5,867,476 | * | 2/1999 | Yoshida et al. | 369/291 |
| 5,917,803 | * | 6/1999 | Goto et al. | 369/291 |

FOREIGN PATENT DOCUMENTS

| 0332214 | 3/1989 | (EP) . |
| 0335461 | 3/1989 | (EP) . |
| 0358269 | 9/1989 | (EP) . |
| 0368347 | 11/1989 | (EP) . |
| 0744743 | 5/1996 | (EP) . |
| 0768664 | 10/1996 | (EP) . |
| 0772196 | 10/1996 | (EP) . |
| 0795866 | 3/1997 | (EP) . |
| WO 97/11463 | 3/1997 | (WO) . |

* cited by examiner

*Primary Examiner*—Brian E. Miller
(74) *Attorney, Agent, or Firm*—McDermott, Will & Emery

(57) ABSTRACT

A cartridge consists of a case and a disk housed therein. The case has a case body in which a head access window and a drive spindle access window are formed. The case has a shutter to open and close the head access window and the drive spindle access window. The case body has in its rear side an opening through which the disk is taken out of and put into the case body. The opening is fitted with a lid that can be taken out of and put into the opening in the direction in which the disk is taken out of and put into the case body. One of the halves constituting the case body has a stopper removal hole, a stopper rest linked to the inner surface of the hole through thin bridges and formed seamlessly therewith, and a stopper whose one end is fixed on the inner surface of the stopper rest and which stops the lid from sliding.

16 Claims, 20 Drawing Sheets

CARTRIDGE CASE FOR A DISK-SHAPED RECORDING MEDIUM WITH PARTICULAR LID CONFIGURATION

BACKGROUND OF THE INVENTION

1. Field of the Invention

The present invention relates to a cartridge case for holding a disk-shaped recording medium in such a way that the recording medium can rotate freely inside the cartridge case and that the recording medium can be put into and taken out of the cartridge case easily for the purpose of loading the recording medium together with the cartridge case holding it into a disk drive device.

In addition, the present invention relates also to a disk cartridge that holds a disk-shaped recording medium in a cartridge case in such a way that the recording medium can rotate freely inside the cartridge case and that the recording medium can be put into and taken out of the cartridge case easily.

2. Description of the Prior Art

For the purpose of loading a disk-shaped recording medium such as an optical disk into a disk drive device, a cartridge case is used that holds the disk-shaped recording medium in such a way that the recording medium can rotate freely inside the cartridge case and that the recording medium can be put into and taken out of the cartridge case easily. Conventionally, this type of cartridge case has on its top side an opening through which the disk-shaped recording medium is put into and taken out of the cartridge case, and has on its bottom side a head access window through which a head for writing and reading data to and from the recording medium is inserted into the cartridge case and a drive spindle access window through which a drive spindle for rotating the recording medium is inserted in the cartridge case. The cartridge case consists essentially of a box-shaped cartridge case body that holds the disk-shaped recording medium in such a way that the recording medium can rotate freely in the cartridge case body, a shutter that is fitted to the cartridge case body in such a way that it can slide along the front edge of the cartridge case body to open and close the head access window and the drive spindle access window, and a lid that is fitted in one edge of the cartridge case body in such a way that it can be flipped into and out of the above-mentioned opening.

In recent years, disk-shaped recording media having recording surfaces on both sides have come into common use. However, using the conventional cartridge case described above to record and reproduce data to and from such a double-sided recording medium causes much trouble, because in such a case it is inevitable, on completion of data recording or reproduction to or from one side, to unload the cartridge case from the disk drive device, take the recording medium out of the cartridge case, reverse the recording medium, put the recording medium in the cartridge case again, and load the cartridge case into the disk drive device again.

To make such temporary removal and reversing of the recording medium unnecessary, it is possible to devise, for example, a cartridge case that has head access windows and drive spindle access windows on both sides. However, if this is attempted on the basis of the structure of the conventional cartridge case described above, the resulting cartridge case will require a complicate structure of the shutter and thus demand higher production cost Specifically, since the head access window and drive spindle access window are provided not only in the cartridge case body but also in the lid, the shutter needs to be designed to have a U-shaped cross section so that it has a pair of shuttering portions, i.e. one for the head access window and drive spindle access window on each side. In addition, since the lid is, as described above, rotatable, one of those shuttering portions also needs to be designed to be rotatable. This makes the structure of the shutter extremely complicate and thus greatly increases cost and labor required for its production.

Moreover, a disk cartridge of the type that holds a disk-shaped recording medium in such a way that the recording medium can be put into and taken out of the cartridge case freely tends to cause its user to damage the recording surface of the recording medium with a scratch or other when the recording medium is being put into or taken out of the cartridge case, causing reading or writing errors. This makes it extremely difficult to verify whether the damage results from mishandling on the part of the user or not, to the manufacturer's disadvantage.

SUMMARY OF THE INVENTION

It is an object of the present invention to provide a cartridge case that has head access windows and drive spindle access windows on both sides and that nevertheless has a structure simple and inexpensive to produce.

It is another object of the present invention to provide a cartridge case that allows the disk-shaped recording medium held in it to be taken out of it easily.

It is a further object of the present invention to provide a disk cartridge that leaves a trace when the disk-shaped recording medium held in a cartridge case is taken out of it by its user.

To achieve the above objects, according to one aspect of the present invention, a cartridge case for a disk-shaped recording medium, provided with a cartridge case body that has a head access window and a drive spindle access window formed on at least one side thereof and that serves to hold the disk-shaped recording medium in such a way that the disk-shaped recording medium can freely rotate therein, and provided with a shutter that is fitted to the cartridge case body in such a way that it can freely slide along the front edge of the cartridge case body to open and close the head access window and the drive spindle access window, is characterized in that the cartridge case body has an opening formed in its rear side so that the disk-shaped recording medium can be put into and taken out of the cartridge case body through the opening by being moved in a direction parallel to its recording surface, and in that the opening is fitted with a lid that can be put into and taken out of the opening by being moved in the direction in which the disk-shaped recording medium is put into and taken out of the cartridge case body.

According to another aspect of the present invention, in a cartridge case as described above, the lid is provided, in its front edge, with a holding means that admits an outer edge of the disk-shaped recording medium and that holds the diskshaped recording medium by being brought into contact with both surfaces of the disk-shaped recording medium as a result of inclination of the disk-shaped recording medium due to its own weight.

According to still another aspect of the present invention, in a disk cartridge that holds a disk-shaped recording medium in a cartridge case in such a way that the recording medium can rotate freely inside the cartridge case and that the recording medium can be put into and taken out of the cartridge case, the cartridge case is provided with a cartridge case body that is composed of top and bottom halves put together with a chamber for accommodating the disk-shaped recording medium left between them, has in one side an opening through which the disk-shaped recording medium is taken out of and put into the cartridge case body, and accommodates the disk-shaped recording medium in such a way that it can rotate freely, and a lid that is fitted into the opening so that it can be taken out of and put into the opening by being slid in a direction in which the disk-shaped recording medium is taken out of and put into the cartridge case body. In addition, this disk cartridge is further provided with a stopper removal hole formed in one of the top and bottom halves, a stopper rest formed inside the stopper removal hole and connected to an inner surface thereof via thin bridges formed seamlessly with the stopper rest and the top or bottom half, and a stopper whose one end is fixed to the stopper rest and which protrudes into the cartridge case body to stop the lid from sliding.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, embodiments of the present invention will be described with reference to the drawings.

First, with reference to FIGS. 1 to 14, a first embodiment of the invention will be described.

Figure 1:
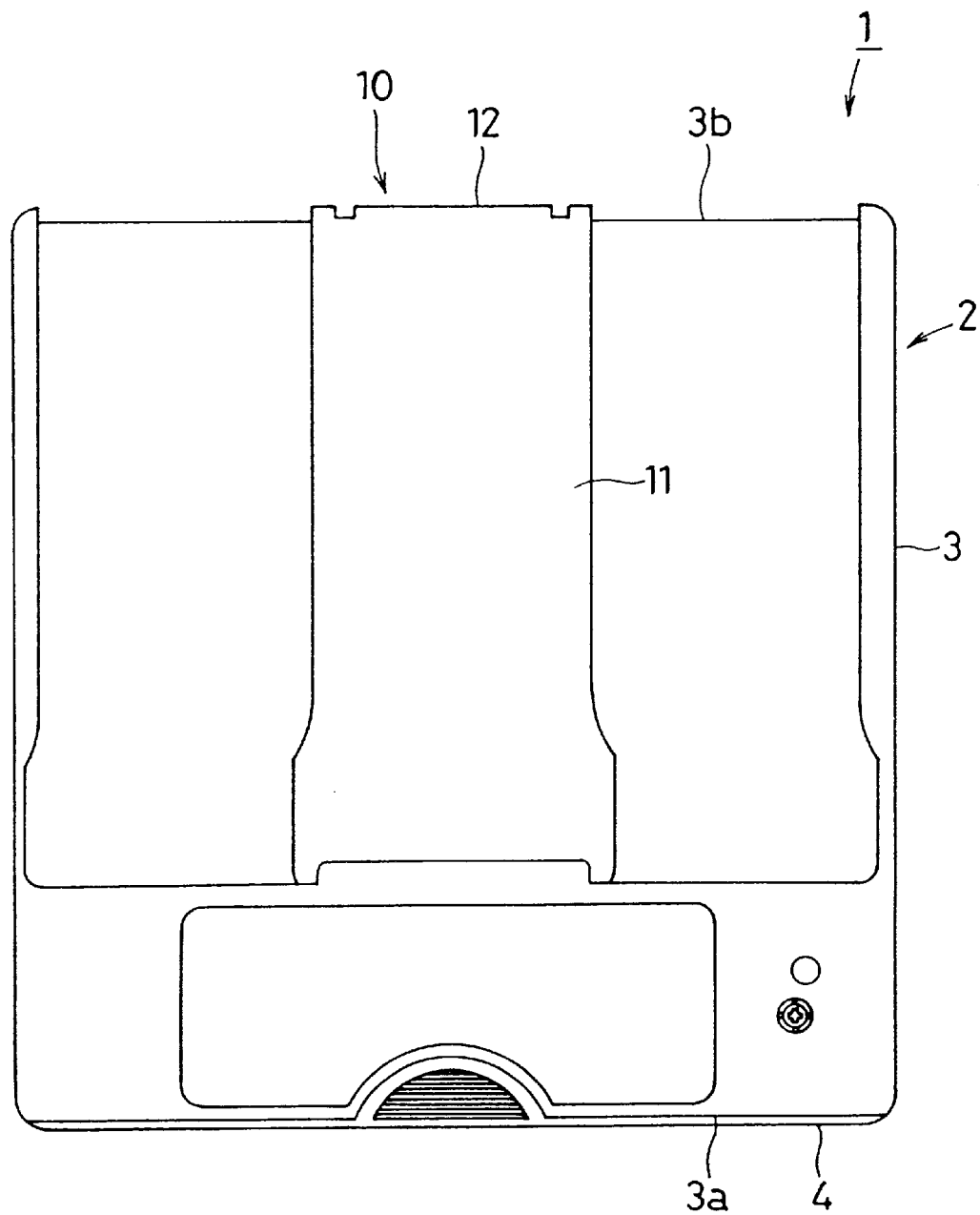
FIG. 1 is a plan view of the disk cartridge of a first embodiment of the invention.

The disk cartridge 1 of the first embodiment is intended for use with a DVD (digital video disc) player having both recording and reproducing capabilities, and is so designed that a disk-shaped recording medium D (see FIG. 13) having recording surfaces on both sides is held in a cartridge case 2 formed by injection-molding synthetic resin. As shown in FIG. 1, the cartridge case 2 consists of a cartridge case body 3 that holds the recording medium in such a way that the recording medium can freely rotate inside the cartridge case body 3, and a lid 4. The cartridge case body 3 has in its rear side an opening 3a through which the recording medium is taken out of and put into the cartridge case body 3, and the lid can be taken out of and put into the opening 3a in the direction in which the recording medium is taken out of and put into the cartridge case body 3.

Figure 2:
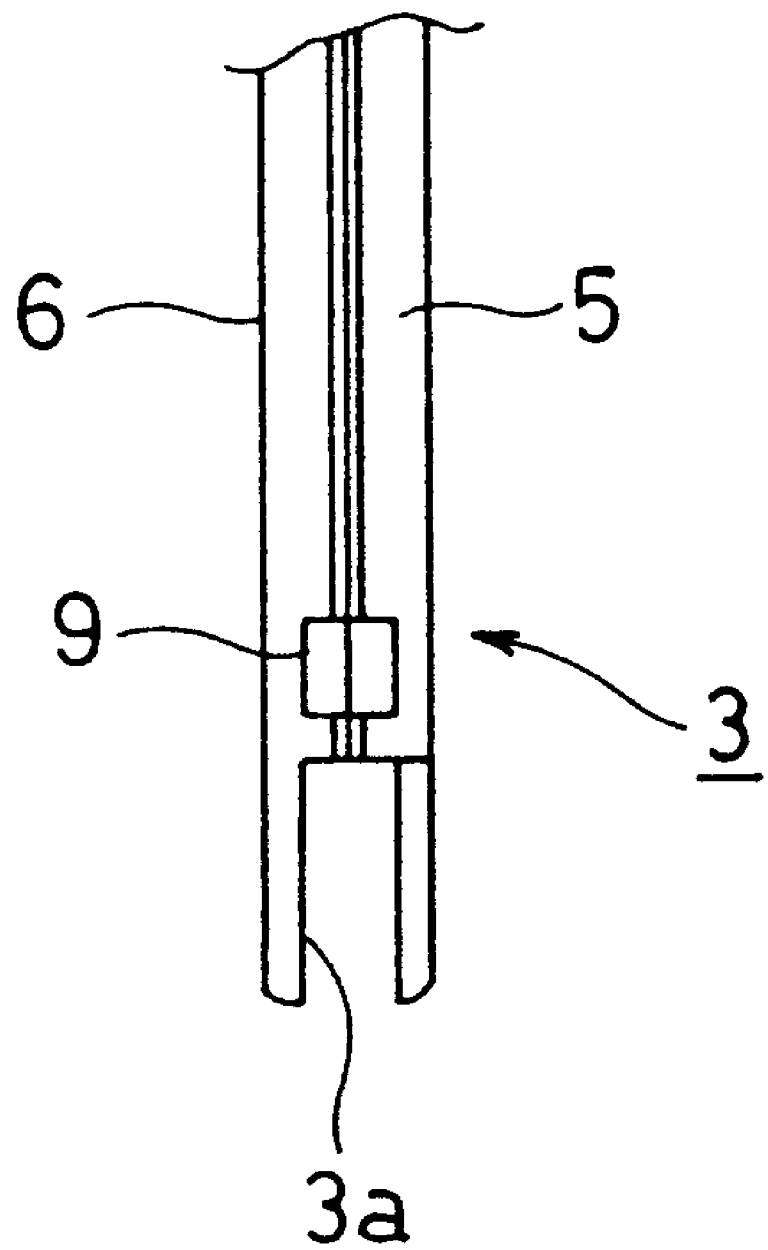
FIG. 2 is a left side view of the rear edge of the cartridge case body.

As shown in FIG. 2, the cartridge case body 3 is composed of top and bottom halves 5 and 6 (see FIGS. 3 and 6) that are put together by ultrasonic welding or with screws or other in such a way that their inner surfaces face each other. In each of the halves 5 and 6 are formed a head access window 7 through which the recording and reproducing head of the DVD player writes and reads data to and from the recording medium D and a drive spindle access window 8 through which the driving spindle for rotating the recording medium D is inserted. Moreover, in the left edge of the cartridge case body 3, close to the opening 3a, a rectangular engagement dent 9 is formed by putting together the top and bottom halves 5 and 6.

As shown in FIG. 1, the cartridge case body 3 is fitted with a shutter 10 for opening and closing the head access window 7 and the drive spindle access window 8. The shutter 10 is a plate of synthetic resin, metal, or other that is formed to have a U-shaped cross section, so that it has a pair of shuttering portions 11 and 11 (only the one on the top side is shown in the figure) arranged parallel to each other and a linking portion 12 linking the two shuttering portions 11 and 11 at their one end. The shutter 10 is, at the inner surface of its linking portion 12, fixed to a slider (not shown) that is fitted to the front edge 3b of the cartridge case body 3 to be freely slidable along that edge. Thus, the shutter 10, by sliding along the front edge 3b of the cartridge case body 3, opens and closes the bead access window 7 and the drive spindle access window 8.

Figure 3:
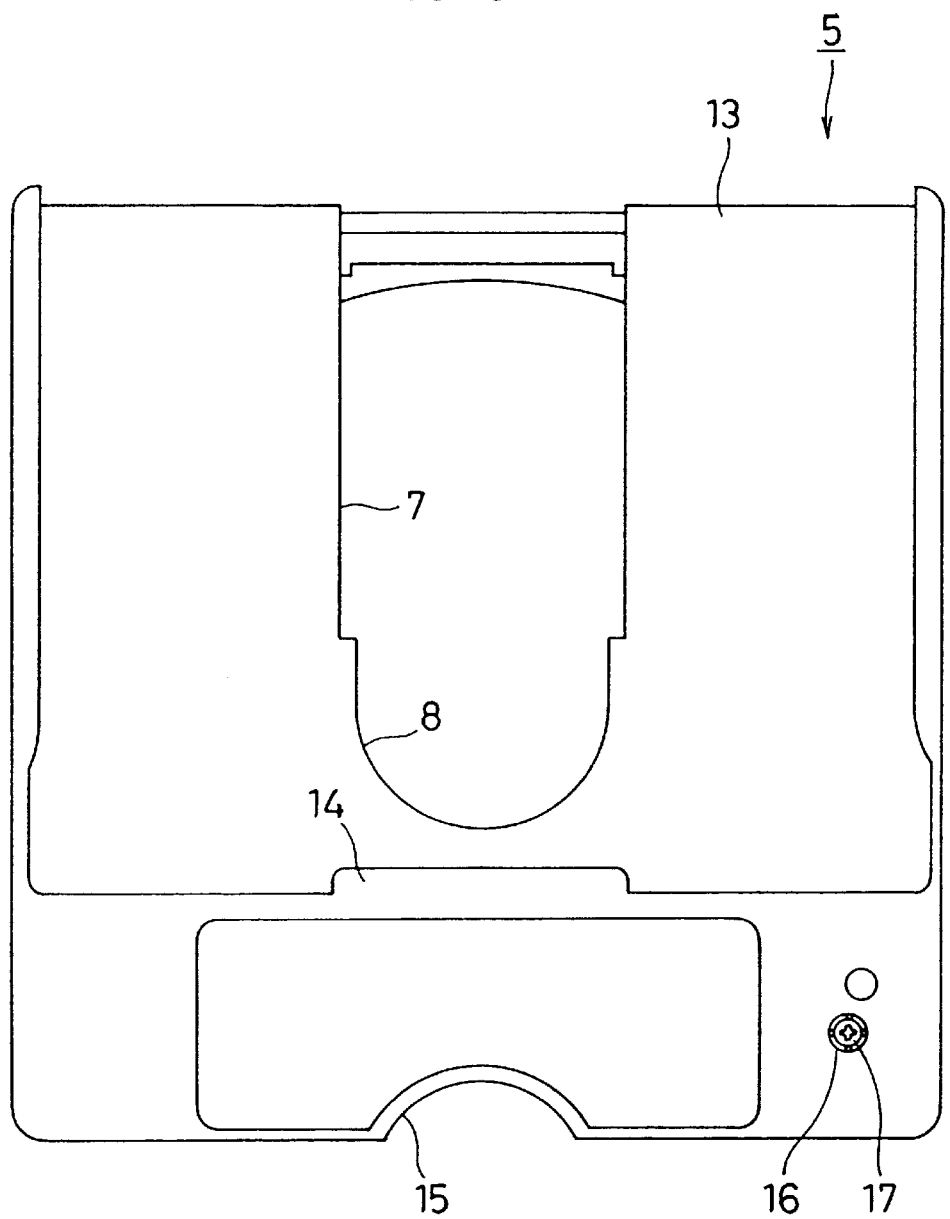
FIG. 3 is a plan view of the top half of the cartridge case body.

As shown in FIG. 3, in the outer surface of the top half 5 is formed a slightly recessed area 13 for accommodating one shuttering portion 11 of the shutter 10, and at the center of the rear end of this recessed area 13 is formed a shutter guide 14 for preventing the free (non-linked) end of the shuttering portion 11 from coming out of the recessed area 13. Moreover, at the center of the rear edge of the top half 5, a semicircular indentation 15 is formed to allow a finger to be placed therein when the lid 4 is flipped out of the cartridge case body 3.

Figure 4:
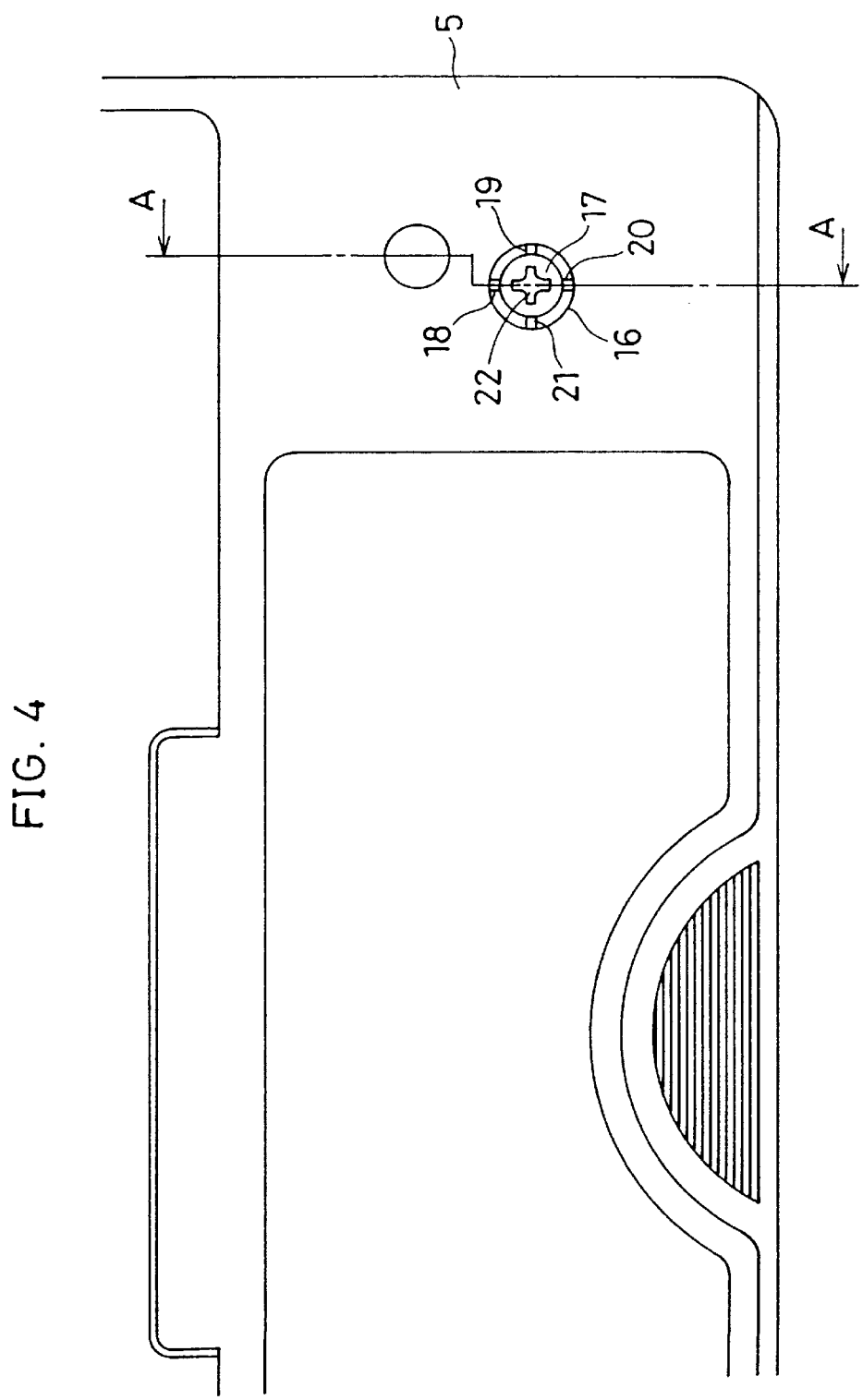
FIG. 4 is a detailed plan view of a part of the disk cartridge.

In the rear-right corner of the top half 5, a circular stopper removal hole 16 is formed, and inside the stopper removal hole 16, a disk-shaped stopper rest 17 is formed concentrically therewith. The stopper rest 17 is formed as one seamless unit with the top half 5. As shown in FIG. 4, the stopper rest 17 is linked to the inner surface of the stopper removal hole 16 through thin bridges 18 to 21, and has, in its outer surface, a cross-shaped cut 22 that engages with the tip of a screwdriver having a cross-headed tip. Since this cut 22 is used simply to allow the bridges 18 to 21 to be broken easily when necessary, the outer surface of the stopper rest 17 may alternatively be provided with a straight cut that engages with the tip of a screwdriver having a flat tip, or even may be left flat, in which case the bridges 18 to 21 are broken by just pressing the outer surface of the stopper rest 17 with a screwdriver or other.

Figure 5:
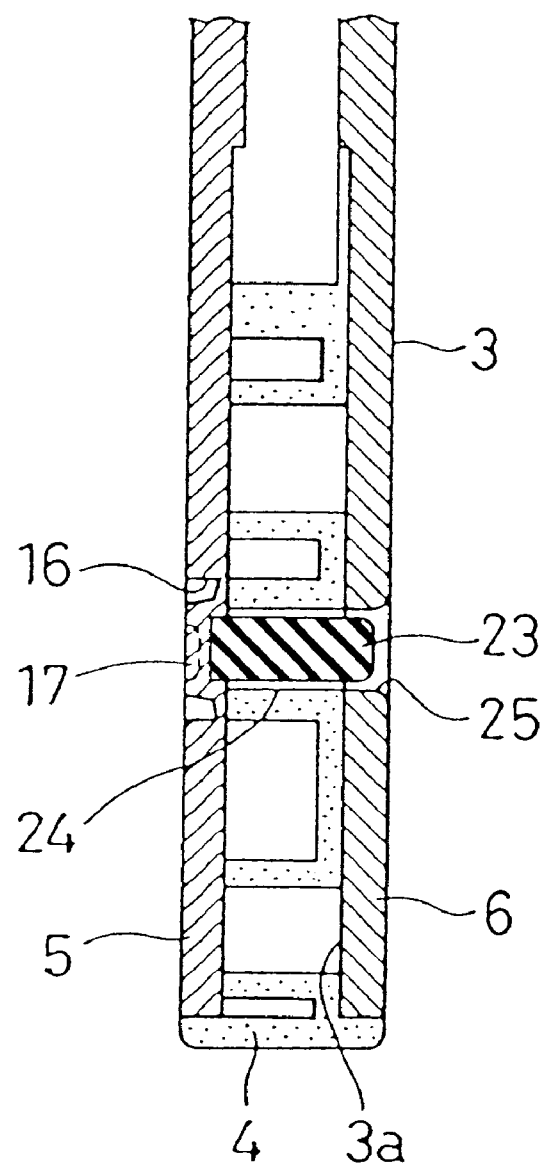
FIG. 5 is a cross section along line A—A in FIG. 4.

As shown in FIG. 5, behind the stopper rest 17, a cylindrical stopper 23 made of synthetic resin is placed which is fixed to the inner surface of the stopper rest 17 at one end and which penetrates the cartridge case body 3 in the vertical (top-to-bottom) direction. On the other hand, in the lid 4, a cylindrical stopper accommodating hole 24 that vertically penetrates the lid 4 is formed in such a way that, when the lid 4 is flipped into the cartridge case body 3, the stopper accommodating hole 24 is concentric with the stopper removal hole 16. Moreover, in the bottom half 6, a circular opening 25 is formed which fits with the stopper accommodating hole 24 in shape and size. The stopper 23 is placed through this stopper accommodating hole 24 with its one end sticking out into the opening 25. Thus, the stopper 23 serves to prevent the lid 4 from being flipped out of the cartridge case body 3.

The stopper 23 does not necessarily need to be arranged with its one end sticking out into the opening 25; as long as it is arranged to penetrate at least one of the top and bottom halves 5 and 6 as well as the lid 4, it serves to prevent the lid 4 from being flipped out.

The stopper 23 is fixed to the inner surface of the stopper rest 17 with adhesive, by ultrasonic welding, or by any other appropriate fixing means. The fixing of the stopper 23 is done from the outside through the opening 25 and the stopper accommodating hole 24 after the disk-shaped recording medium D is placed inside the cartridge case body 3 and the lid 4 is fitted to the cartridge case body 3.

As described heretofore, in the first embodiment, it is possible to fix the stopper 23 to the stopper rest 17 from outside of the cartridge case body 3. This means that the disk cartridge 1 can be manufactured either by putting together the top and bottom halves 5 and 6 to form the cartridge case body 3 first before the disk-shaped recording medium D is placed in the cartridge case body 3, or by putting together the top and bottom halves 5 and 6 after the disk-shaped recording medium D is placed between them. Thus, this embodiment is useful to flexibly cope with varying requirements of customers and different types of production line.

Note that the mold that is used to form the outer surface of the top half 5 of the first embodiment is so constructed that its portion that forms the stopper removal hole 16 is interchangeable. This makes it possible to form the stopper removal hole 16 into a different shape. For example, it is possible to fill the stopper removal hole 16 completely (i.e. leave that portion flat) to obtain a disk cartridge that does not allow the stopper, thus the disk-shaped recording medium D, to be removed.

Figure 6:
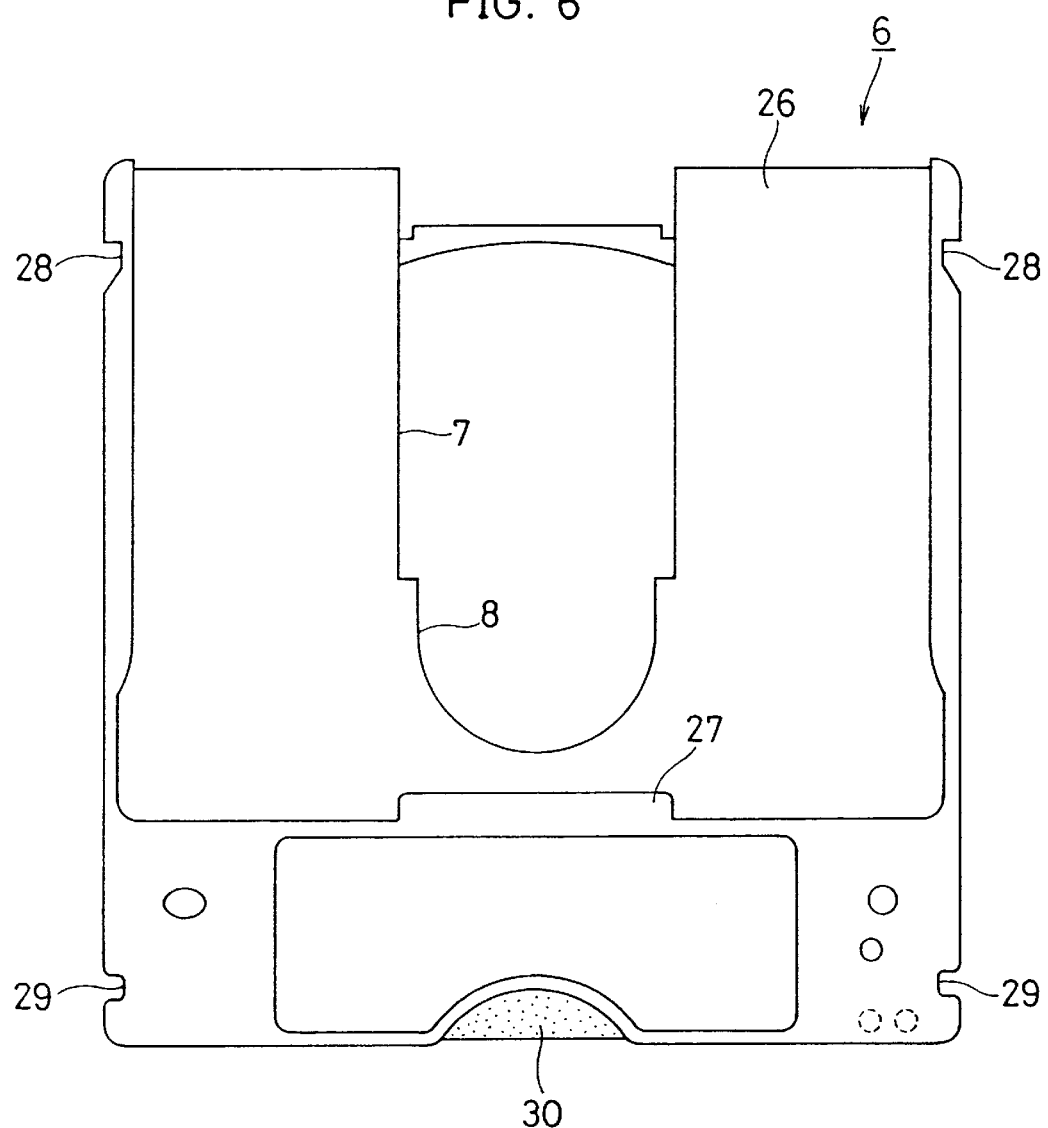
FIG. 6 is a plan view of the bottom half of the cartridge case body.

As shown in FIG. 6, in the outer surface of the bottom half 6 is formed a slightly recessed area 26 for accommodating the other shuttering portion 11 of the shutter 10, and at the center of the rear end of this recessed area 26 is formed a shutter guide 27 for preventing the free end of the shuttering portion 11 from coming out of the recessed area 26. In the right and left edges of the bottom half 6, close to the front edge, are formed locking-slot forming portions 28 and 28 that form locking slots with which the locking members of the disk drive device engage to keep the disk cartridge in position when the disk cartridge is loaded into the disk drive device. In the right and left edges of the bottom half 6, close to the rear edge, are formed outer gripping slot forming portions 29 and 29 that form gripping slots with which the gripping members of the autochanger mechanism of the disk drive device engage. Moreover, at the center of the rear edge of the bottom half 6, a semicircular recess 30 is formed to allow a finger to be placed therein when the lid 4 is flipped out of the cartridge case body 3. The recess 30 has its surface mat-finished to prevent slippage of the finger.

Figure 7:
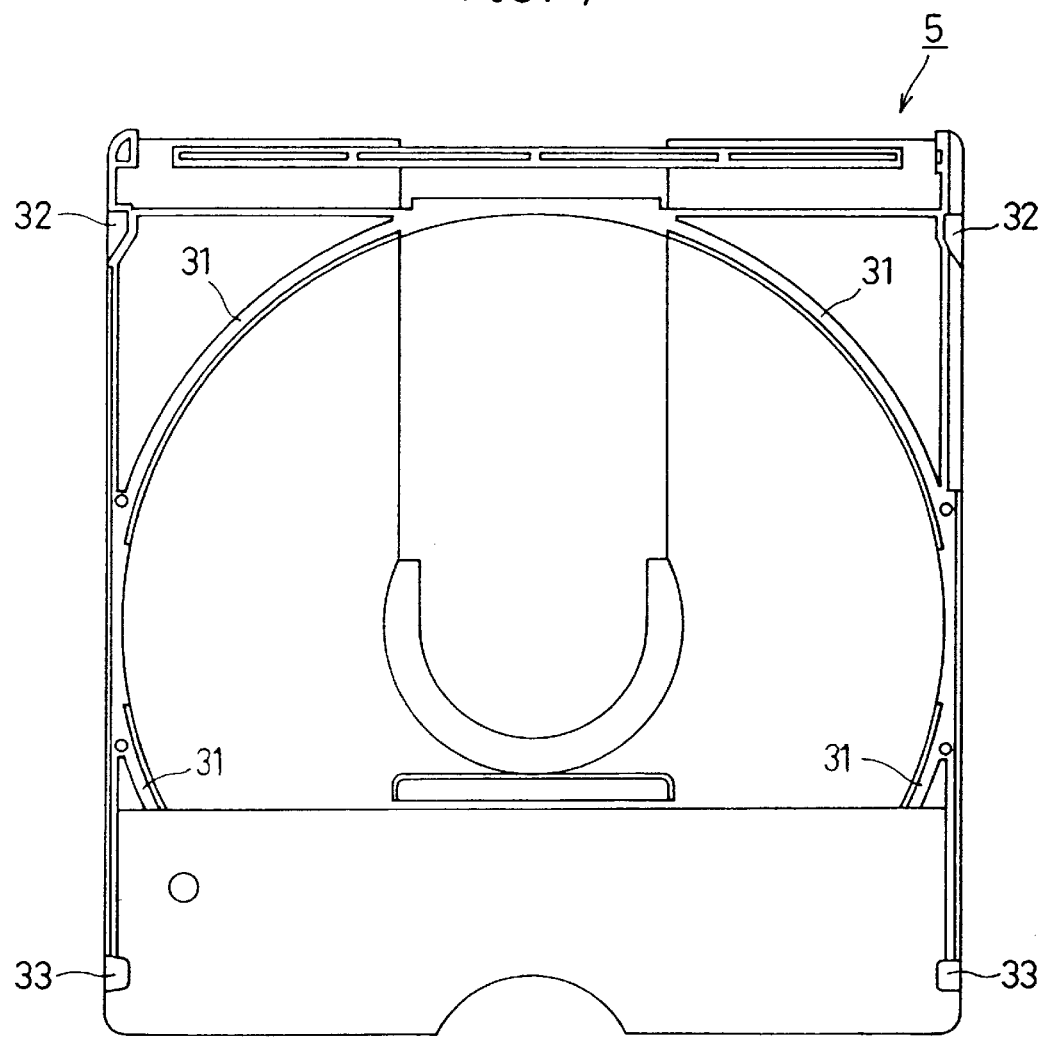
FIG. 7 is a plan view of the top half as seen from the inside.
Figure 9:
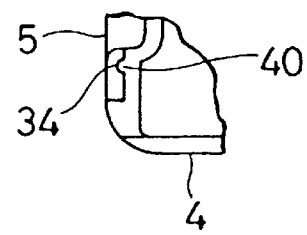
FIG. 9 is a detailed view of part B in FIG. 8.

As shown in FIG. 7, the top half 5 has ribs 31 formed along an arc on its inner surface, and the bottom half 6 has similar ribs (not shown) along an arc on its inner surface. These ribs are so designed that, when the top and bottom halves 5 and 6 are put together, they fit together to form a chamber in which the disk-shaped recording medium D is accommodated. Moreover, in the right and left edges of the inner surface of the top half 5, close to the front edge, are formed locking-slot forming portions 32 and 32 that fit with the locking-slot forming portions 28 and 28 to form the locking slots. In the right and left edges of the inner surface of the bottom half 6, close to the rear edge, are formed gripping-slot forming portions 33 and 33 that fit with the locking-slot forming portions 29 and 29 to form the gripping slots. Moreover, as shown in FIG. 9, in the inner surface of the right-side wall of the top half 5 is formed an engagement groove 34 that extends vertically and that engages with an engagement projection 40, described later, formed in the lid 4.

Figure 8:
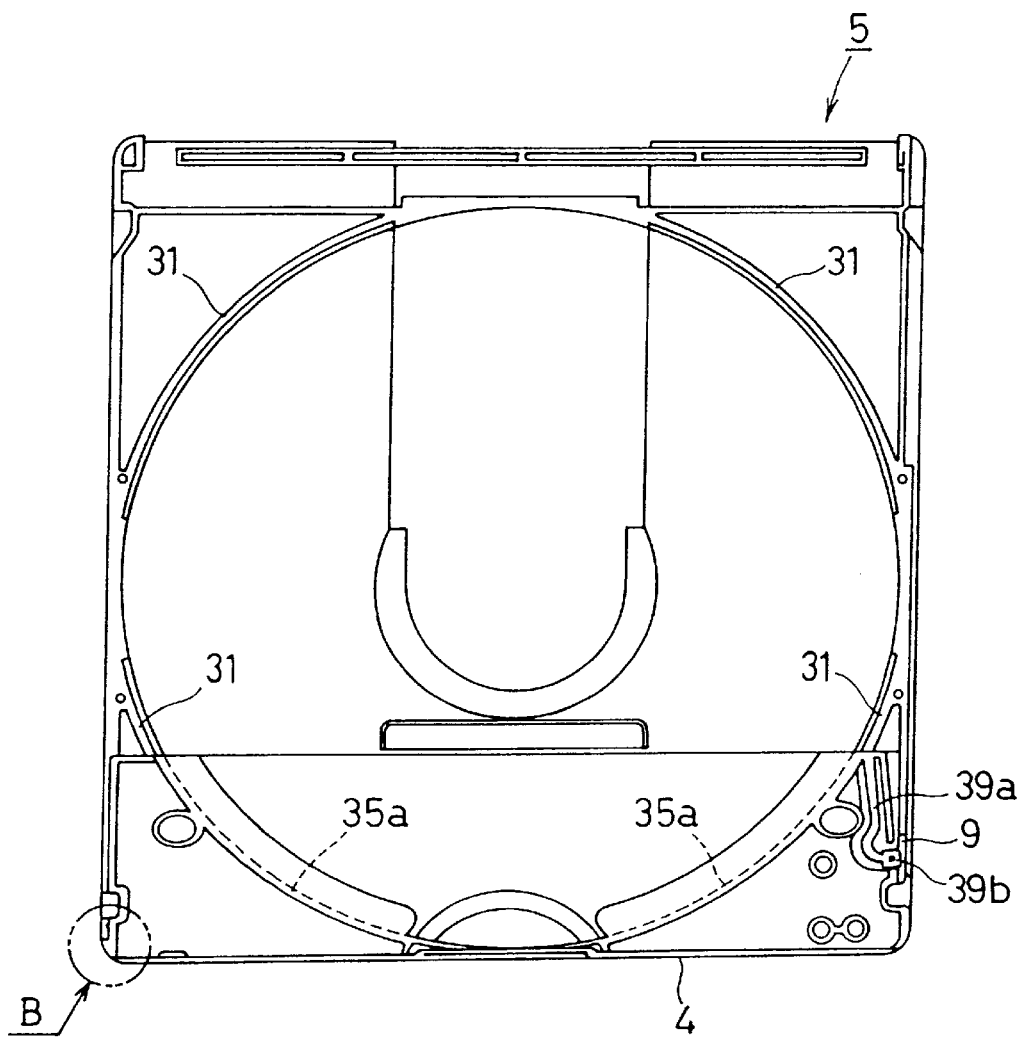
FIG. 8 is a plan view of the top half with the lid inserted as seen from the inside.
Figure 10:
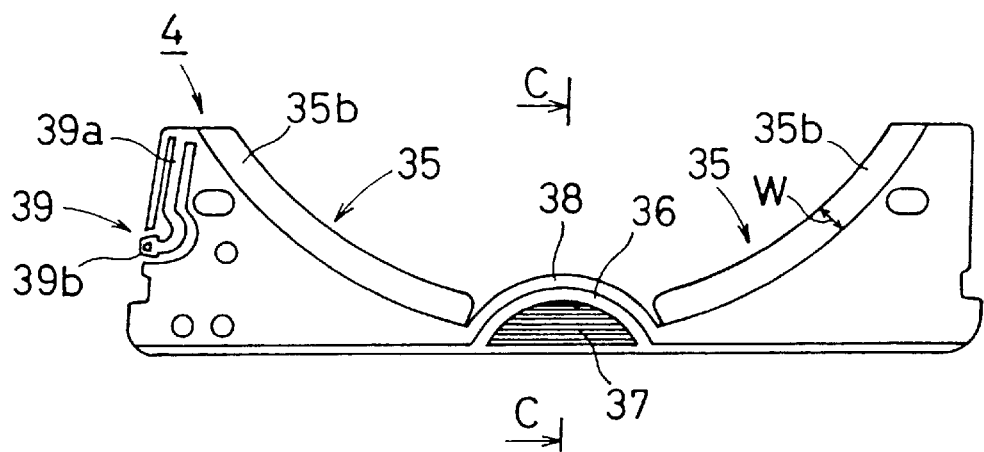
FIG. 10 is a plan view of the lid.
Figure 11:
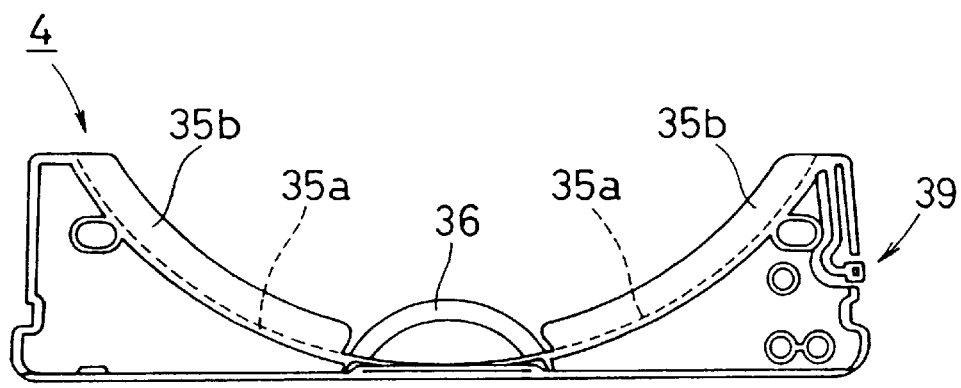
FIG. 11 is a plan view of the lid as seen from the inside.

In the first embodiment, the lid 4 is designed to ease the disk-shaped recording medium D into and out of the cartridge case body 3. Specifically, as shown in FIG. 10, it has, on its front-edge side, a recessed disk rest 35 to place a peripheral part of the disk-shaped recording medium D on. The disk rest 35 consists of a circumferential wall 35a that extends vertically to face the outer side of the disk-shaped recording medium D and that is formed in an arc shape that fits with the side of the recording medium D, and a pair of lower protrusions 35b and 35b that horizontally protrude from the bottom ends of the circumferential wall 35a. As shown in FIG. 8, when the lid 4 is flipped into the cartridge case body 3, the circumferential wall 35a fits with the ribs 31 formed on the inner surface of the top half 5 and thereby constitutes part of the above-mentioned disk accommodating chamber.

At the center of the top side of the circumferential wall 35a is formed a semicircular upper protrusion 36 that protrudes horizontally therefrom. The lower protrusions 35b and 35b are so arranged that, when seen from above, they do not overlap with the upper protrusion 36 arranged above them but are situated on both sides thereof. This eliminates the need to use a mold having a sliding structure to form the flip 4, and thus helps reduce the cost of the mold.

Figure 12:
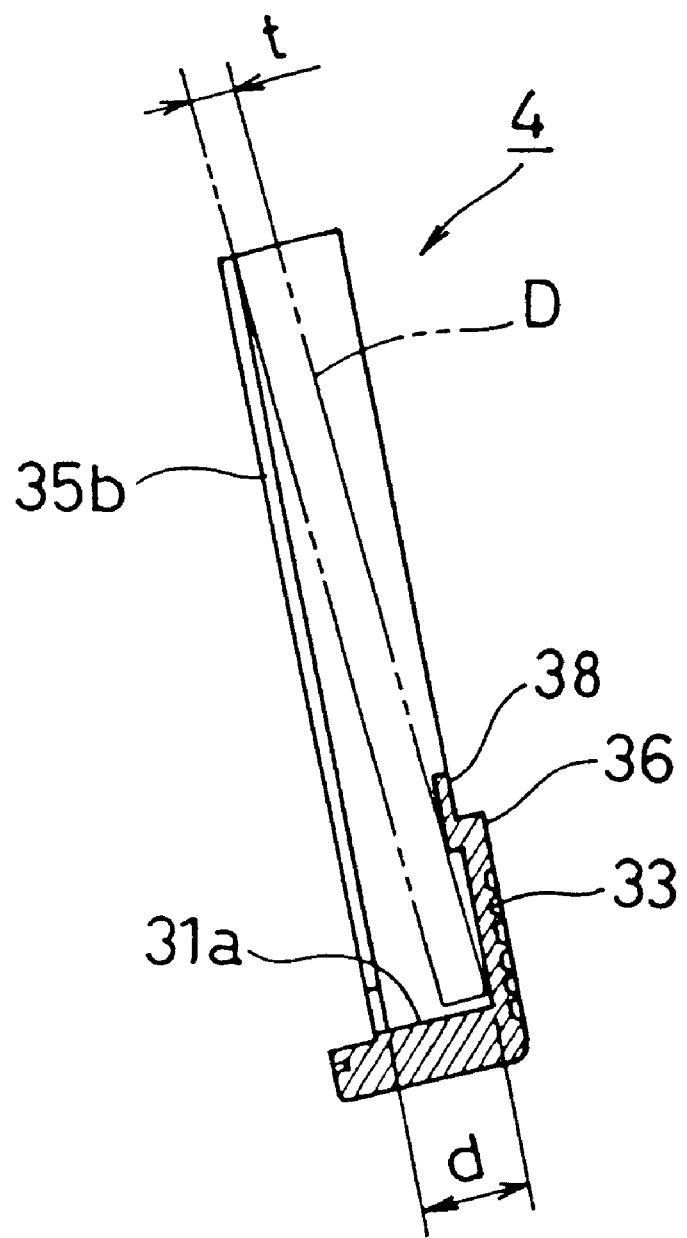
FIG. 12 is a view of the lid as seen from line C—C in FIG. 10.

As shown in FIG. 12, the distance d between the inner surfaces of the lower protrusions 35b and the inner surface of the upper protrusion 36 is set at approximately twice the thickness t of the disk-shaped recording medium D, so that, when the disk-shaped recording medium D is in a slanted state as shown in FIG. 12, the weight of the recording medium D itself causes the recording medium D to contact, at the outer edge of its top surface, the inner surface of the upper protrusion 36, and simultaneously contact, at the positions the distance W (W represents the width of the lower protrusions 35b; see FIG. 10) away from the outer edge of its bottom surface, the front edges of the lower protrusions 35b. As a result, the disk-shaped recording medium D is held in the lid 4 by its own action as a lever having its fulcrum at the front edges of the lower protrusions 35b. Thus, the disk-shaped recording medium D is supported at three points, i.e. one point on its top surface and two points that are located on its bottom surface and on both sides of the first point.

Figure 14:
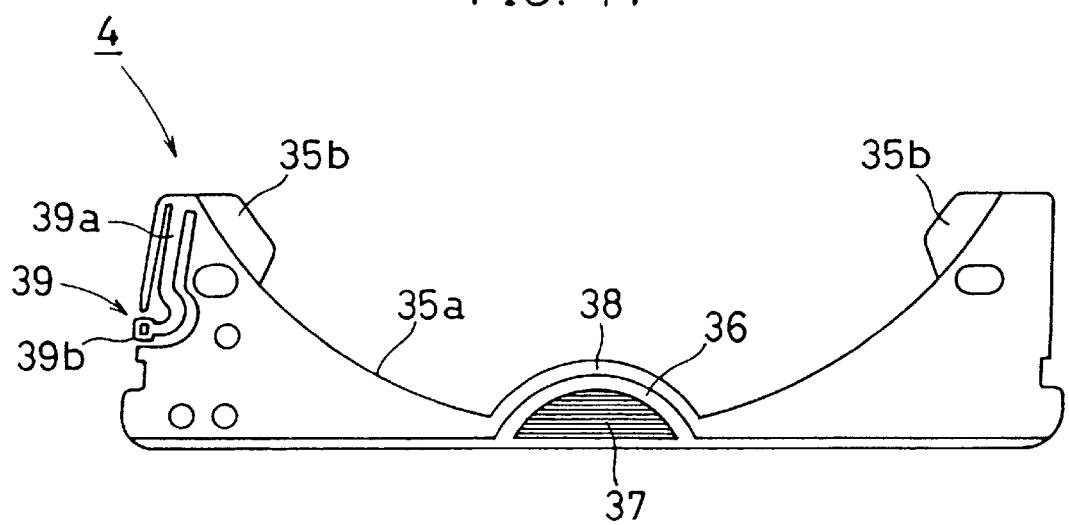
FIG. 14 is a plan view of a modified type of the lid 4.

It is possible to support the disk-shaped recording medium D sufficiently stably even if the width W of the lower protrusions 35b is considerably small; however, to increase stability, it is preferable to support its top surface at a position as close from the edge as possible and its bottom surface at positions as far from the edge as possible. As shown in FIG. 14, it is also possible to support the disk-shaped recording medium D sufficiently stably simply by forming the lower protrusions 35b only at both ends of the bottom side of the circumferential wall 35a.

As shown in FIG. 10, the upper protrusion 36 has on its top surface a semicircular finger rest 37, which has on its surface a plurality of grooves formed laterally across it. Moreover, the upper protrusion 36 has, along its front edge, a recessed portion 38 which, when the lid 4 is flipped into the cartridge case body 3, is inserted into the cartridge case body 3 to prevent dust from entering the cartridge case body 3 through the gap between the indentation 15 of the top half 5 (see FIG. 3) and the upper protrusion 36.

As shown in FIG. 10, the lid 4 has, in its left edge, a locking arm 39 so that it can be removably locked into the cartridge case body 3. The locking arm 39 is formed as one seamless unit with the lid 4, and consists of a bar-shaped resilient base portion 39a that extends along the side edge of the lid 4, is linked to the lid 4 at one end, and has the other end formed into a hook-like shape with the end pointing outward, and an engagement portion 39b that is formed at the open (non-linked) end of the base portion 39a, protrudes from the side-edge line of the lid 4, and removably engages with the engagement dent 9 of the cartridge case body 3. Moreover, as shown in FIG. 9, in the right edge of the lid 4, close to the rear edge, is formed an engagement projection 40 that extends vertically and that engages with the engagement groove 34 formed in the inner surface of the right-edge wall of the top half 5.

When the lid 4 is inserted into the opening 3a of the cartridge case body 3, the end of the engagement portion 39a is pressed inward by the rear portion of the right side wall of the cartridge case body 3, and the base portion 39a is bent inward. When the lid 4 is pressed further inward until it reaches the predetermined position, as shown in FIG. 8, the end of the engagement portion 39b engages with the engagement dent 9 of the cartridge case body 3 through the resilience of the base portion 39a, and, in addition, the engagement projection 40 formed in the right edge of the lid 4 snaps into the engagement groove 34 of the top half 5. In this way, the lid 4 is locked in the cartridge case body 3. Here, the lid 4 is locked with a force strong enough to prevent the lid 4 from being inadvertently ejected out of the cartridge case body 2 merely by a shock or other, but weak enough to allow the engagement portion 39b to be disengaged from the engagement dent 9 simply by pressing inward the end of the engagement portion 39b with a finger or something having a pointed tip, or by pulling the lid 4 in the direction opposite to its insertion direction with the end of the engagement portion 39b held pressed. Alternatively, it is also possible to lock the lid 4 to the cartridge case body 3 by using only the locking arm 39 and the engagement dent 9 without providing the engagement projection 40 and the engagement groove 34. The lid 4 and the cartridge case body 3 may be made of any material; however, to make the locking arm flexible enough, to allow smooth engagement of the engagement projection and groove 52 and 53, to make the lid 4 and the cartridge case body 3 heat-resistant, and to produce them at low cost, the use of ABS resin is preferable.

It should be understood that the lid 4 may be locked in the cartridge case body 3 by any other means than is described above. For example, if an upward projection is formed at the front edge of the recessed portion 38 of the upper protrusion 36, and a dent or groove that engages with that upward projection, or a linear projection that is crossed over by that upward projection to achieve engagement when the lid 4 is inserted, is formed in the inner surface of the cartridge case body 3, the lid 4 can be flipped out by pressing the finger rest 37 with a finger and thereby disengaging the engagement. In short, the lid 4 may be locked in any manner as long as it is not ejected inadvertently and nevertheless it is easily flipped out when the disk-shaped recording medium D is put into or taken out of the cartridge case body 3.

Next, a description will be given as to how the disk cartridge 1 constituted as described heretofore is used. Specifically, the following description explains how the disk-shaped recording medium D is taken out of the cartridge case 2, and how the disk-shaped recording medium D thus taken out is put back into the cartridge case 2.

The disk-shaped recording medium D is taken out of the cartridge case 2 in the following manner. First, the bridges 18 to 21 are broken with a screwdriver having a cross-headed tip that is rotated with its tip put into and engaged with the cross-shaped cut 22 formed in the stopper rest 17 at the entrance of the stopper removal hole 16 formed in the rear-right corner of the disk cartridge 1. Then, the stopper removal hole 16 is directed downward to cause the stopper rest 17 to come out of the stopper removal hole 16 together with the stopper 23 so that the lid 4 is put into an unlocked state.

Next, while the disk cartridge 1 is held with its rear edge pointing obliquely downward, the engagement portion 39b is disengaged from the engagement dent 9 by pressing inward the end of the engagement portion 39b with a finger or something having a pointed tip, or by pulling the lid 4 in the direction opposite to its insertion direction with the engagement portion 39b held pressed. Then, with one finger placed on the finger rest 37 of the lid 4 and another finger placed on the recess 30 of the bottom half 6, the lid 4 is pulled outward so that its left-hand portion comes out of the cartridge case body 3. Then, in this state, the lid 4 is twisted a little such that its left-hand portion is lifted slightly to disengage the engagement projection 40 formed in the right edge of the lid 4 from the engagement groove 34 of the top half 5. In this way, the lid 4 is completely separated from the cartridge case body 3. As the lid 4 is pulled out, the disk-shaped recording medium D comes out of the cartridge case body 3 together.

Thus, it is possible to verify whether the disk-shaped recording medium D housed in the disk cartridge 1 has ever been taken out or not simply by checking whether the bridges 18 to 21 of the disk cartridge 1 are broken or not.

The disk-shaped recording medium D is put back into the cartridge case 2 in the following manner. First, as shown in FIG. 12, while the lid 4 is held with its rear edge pointing obliquely downward, an outer edge of the disk-shaped recording medium D is inserted between the lower protrusions 35b of the disk rest 35 and the upper protrusion 36.

When the disk-shaped recording medium D is set free, the weight of the recording medium D itself causes the recording medium D to contact, on its bottom surface, the inner surfaces of the lower protrusions 35b, and simultaneously contact, on its top surface, the inner surface of the upper protrusion 36. In this way, the disk-shaped recording medium D is held in the lid 4 by its own action as a lever having its fulcrum at the front edges of the lower protrusions 35b.

Figure 13:
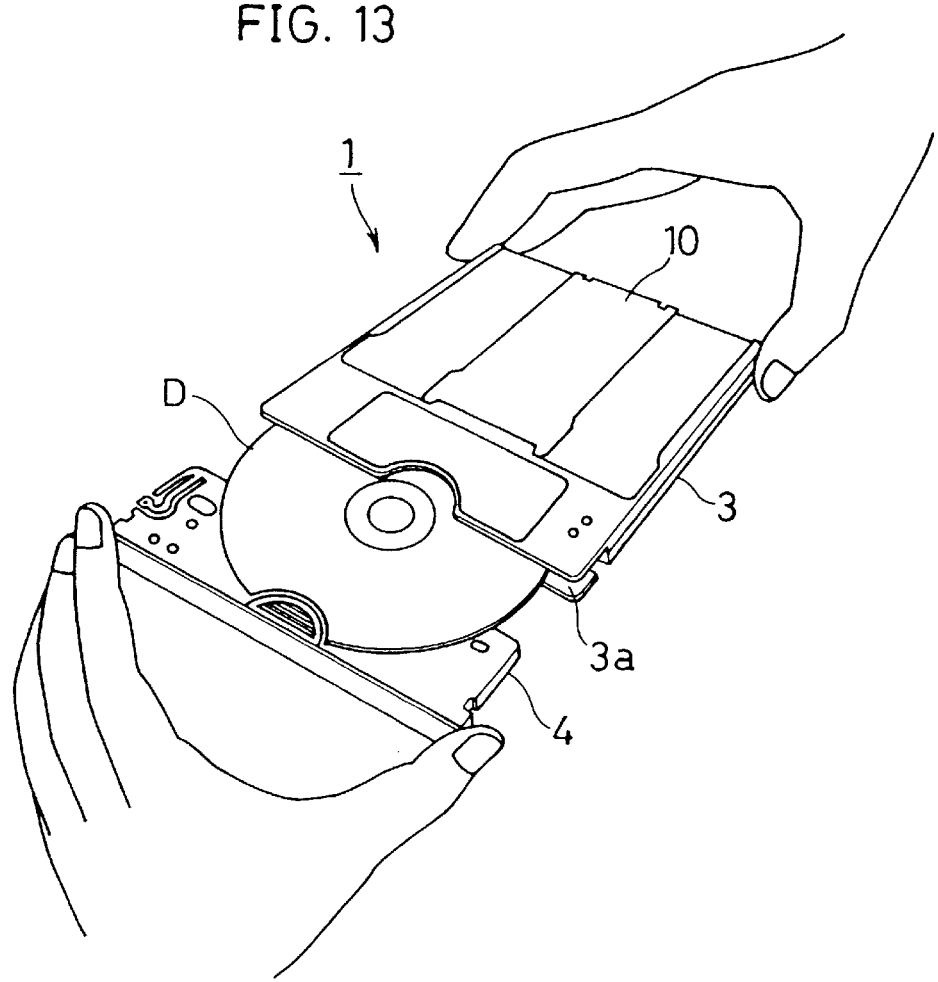
FIG. 13 is a perspective view of the disk cartridge in use.

Then, as shown in FIG. 13, while the cartridge case body 3 is held with its opening 3a pointing obliquely downward, the other end of the disk-shaped recording medium D held in the lid 4 is inserted through the opening 3a into the cartridge case body 3 in a direction parallel to the recording surface of the recording medium D. When the recording medium D reaches the predetermined position, the engagement portion 39b of the locking arm 39 of the lid 4 engages with the engagement dent 9 of the cartridge case body 3, and, in addition, the engagement projection 40 of the lid 4 snaps into the engagement groove 34 of the top half 5. Now, the disk cartridge 1 is ready to be loaded into the disk drive device.

Next, with reference to FIGS. 15 and 16, a second embodiment of the invention will be described.

Note that in the following descriptions of the other embodiments of the invention, such elements and features as are also found in the first embodiment described heretofore will not be repeated.

Figure 15:
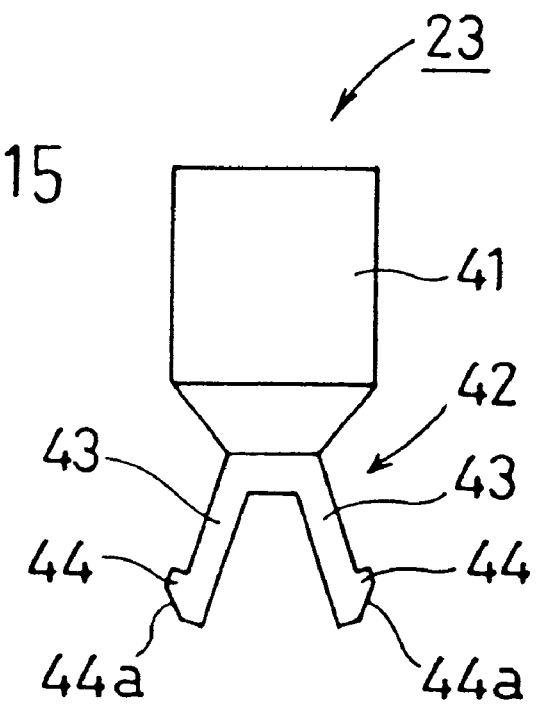
FIG. 15 is a side view of the stopper employed in the disk cartridge of a second embodiment of the invention.
Figure 16:
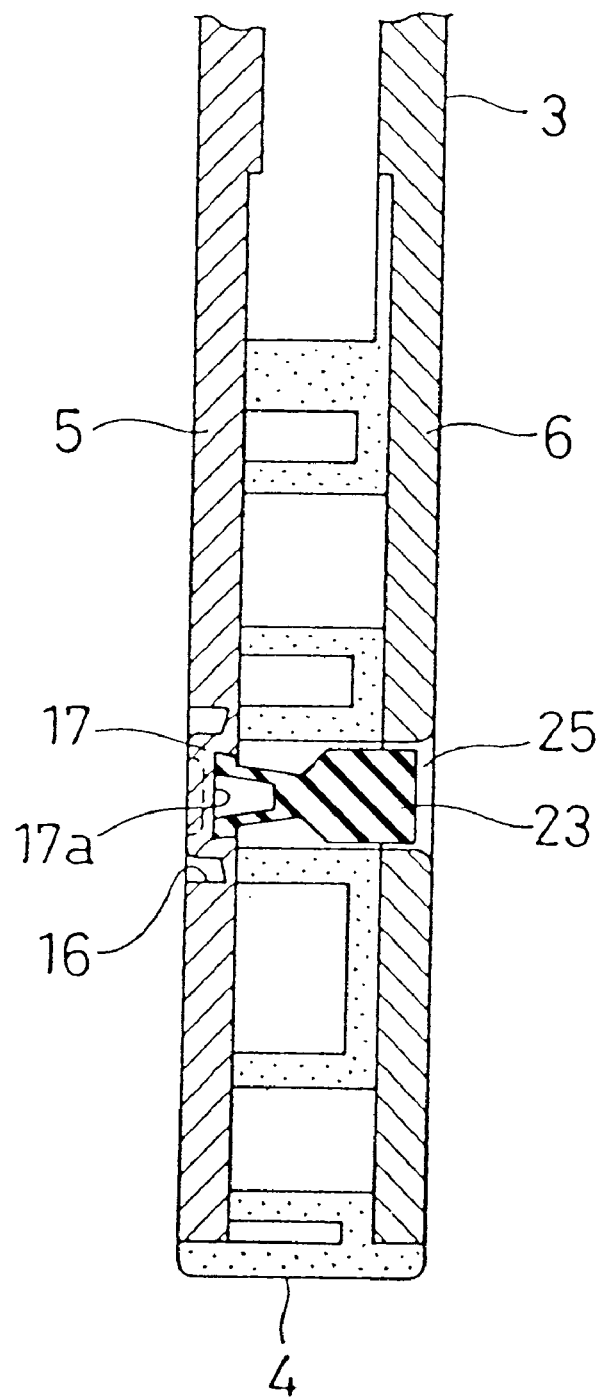
FIG. 16 is a cross section of a part of the cartridge case body, showing the stopper fitted into it.

As shown in FIG. 15, the stopper 23 consists of a cylindrical base 41 and an engagement means 42, and, as shown in FIG. 16, the stopper rest 17 has, in its inner surface, a circular recess 17a that engages with the engagement means 42.

The engagement means 42 consists of a pair of resilient linear portions 43 and 43 that are formed to extend downward and symmetrically on both sides of an extension of the center line of the base 41, and engagement portions 44 and 44 formed on the outer edges of the linear portions 43 and 43 at their bottom ends. The engagement portions 44 and 44 have inclined surfaces 44a formed by cutting their outer bottom corners slantwise.

As the stopper 23 is pressed into the opening 25 of the bottom half 6 by using a dedicated fixture applied thereto, first, the inclined surfaces 44a contact the entrance rim of the recess 17a formed in the stopper rest 17, and then the linear portions 43 and 43 advance inward against their resilience. When the stopper 23 is inserted until the bottom ends of the engagement means 42 reach the bottom of the recess 17a, the inclined surfaces 44a of the engagement portions 44 and 44 cross over the entrance rim of the recess 17a, and the side edges of the engagement portions 44 and 44 are pressed against the circumferential surface of the recess 17a by the resilience of the linear portions 43 and 43. Note that the recess 17a is so formed that its circumferential surface has increasingly smaller diameters toward the entrance rim, so that the engagement means 42 does not readily come out of the recess 17a.

As described above, in the second embodiment, the stopper 23 is fitted to the stopper rest 17 without using adhesive. This not only makes the stopper 23 easy to handle and fit, but also contributes to the enhancement of productivity by reducing the time required for the fitting of the stopper 23.

In the descriptions heretofore of the first and second embodiments, it is assumed that the stopper 23 and the stopper rest 17 are formed as separate parts so that the stopper 23 can be fitted even from outside of the cartridge case 2. However, in cases where the disk cartridge is manufactured by putting the top and bottom halves 5 and 6 together after placing the disk-shaped recording medium D therebetween, it is also possible to form the stopper 23 and the stopper rest 17 as one seamless unit. This helps reduce the number of parts and thus the labor and cost required for the production of the disk cartridge.

FIGS. 17 to 23 show distinctive portions of the disk cartridge of a third embodiment of the invention.

Figure 17:
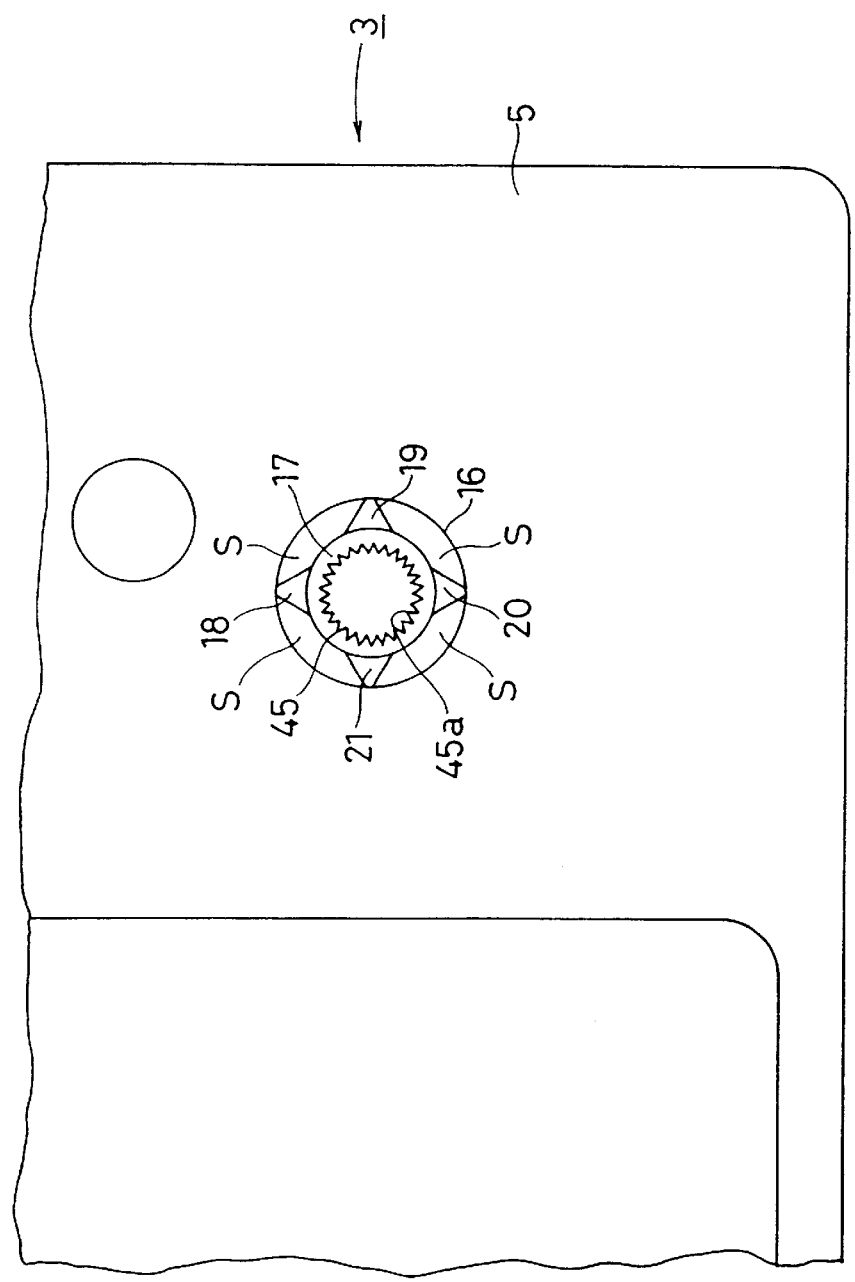
FIG. 17 is a detailed plan view of a part of the top half of the disk cartridge of a third embodiment of the invention.
Figure 23:
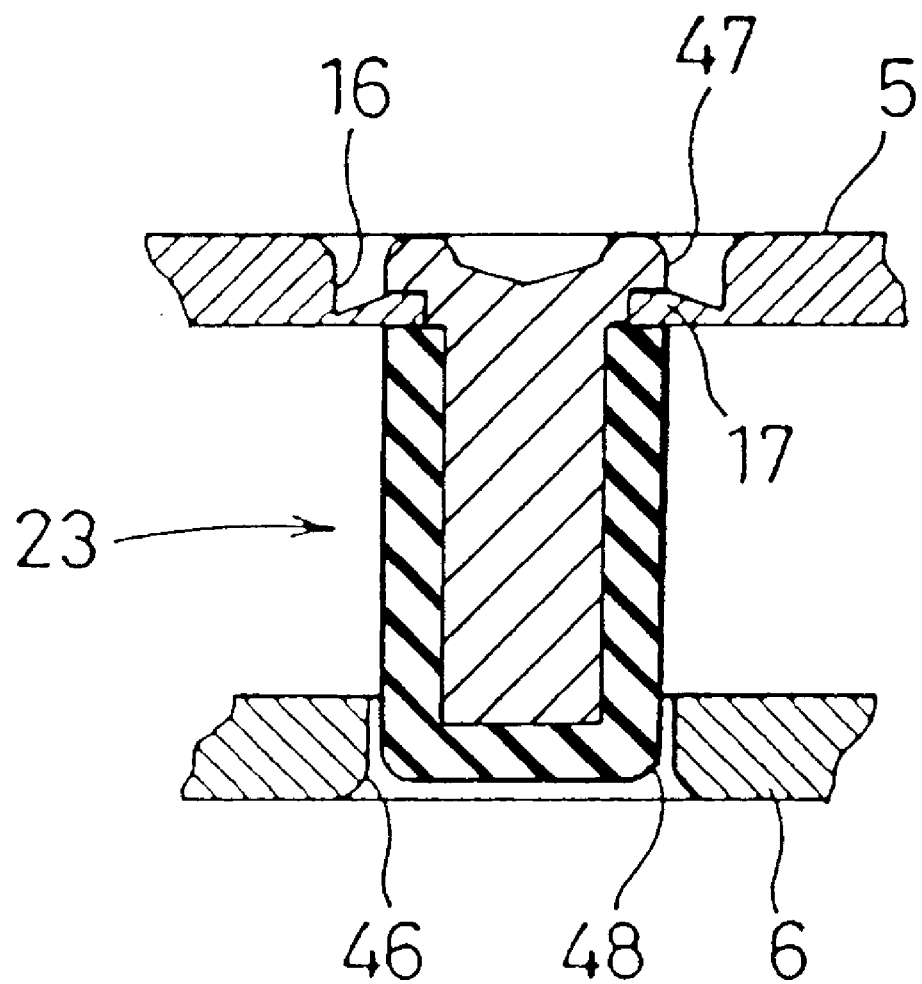
FIG. 23 is a cross section along line E—E in FIG. 21.

As shown in FIG. 17, in the third embodiment, the stopper rest 17 has a circular through hole 45 formed concentrically with the stopper removal hole 16. Moreover, as shown in FIG. 23, in the bottom half 6, at the position opposite to the stopper rest 17 formed in the top half 5, a circular opening 46 is formed concentrically with the through hole 45. The stopper 23 consists of a stopper body 47 and a fitting member 48. The stopper body 47 consists of a cylindrical shaft portion 49 that penetrates the through hole 45 of the stopper rest 17 (see FIG. 19), and a flange 50 that is formed at the top end of the shaft portion 49 and that contacts the portion around the through hole 45 on the top surface of the stopper rest 17 and the. The fitting member 48 has the shape of a cylinder with a bottomed hole formed in it, and engages with the shaft portion 49 to fix the stopper body 47 to the stopper rest 17. The fitting member 48 may have the shape of a cylinder with through hole formed in it.

Figure 19:
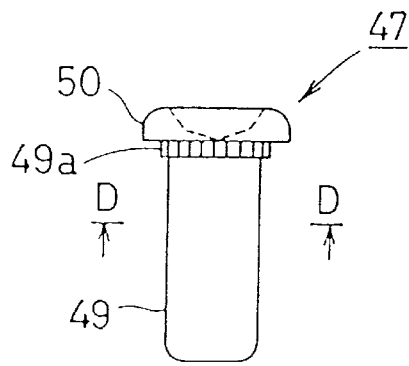
FIG. 19 is a side view of the stopper body shown in FIG. 17.
Figure 20:
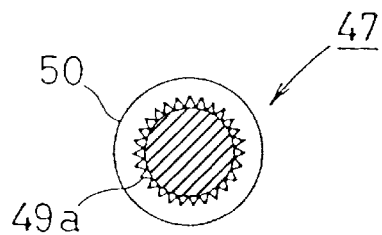
FIG. 20 is a cross section along line D—D in FIG. 19.

As shown in FIG. 17, all over the inner surface of the through hole 45 of the stopper rest 17, a plurality of vertically extending grooves (a first engagement portion) 45a are formed. As shown in FIGS. 19 and 20, all around the neck portion of the stopper body 47, a plurality of vertically extending ridges 49a (a second engagement portion) are formed in a shape that fits the grooves 45a, so that the ridges 49a can be slid into and engaged with the grooves 45a. Thus, the grooves 45a and the ridges 49a serve to prevent the stopper body 47 from rotating about the center line of the shaft portion 49 relative to the stopper rest 17.

Figure 18:
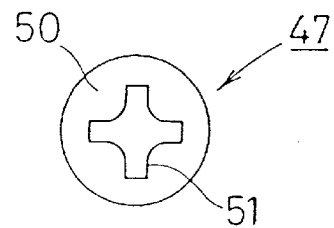
FIG. 18 is a plan view of the stopper body.
Figure 21:
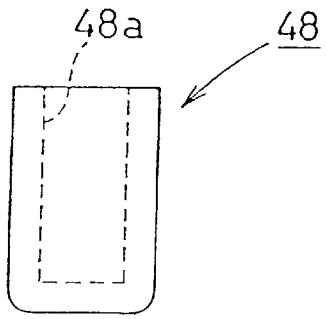
FIG. 21 is a side view of the fitting member.
Figure 22:
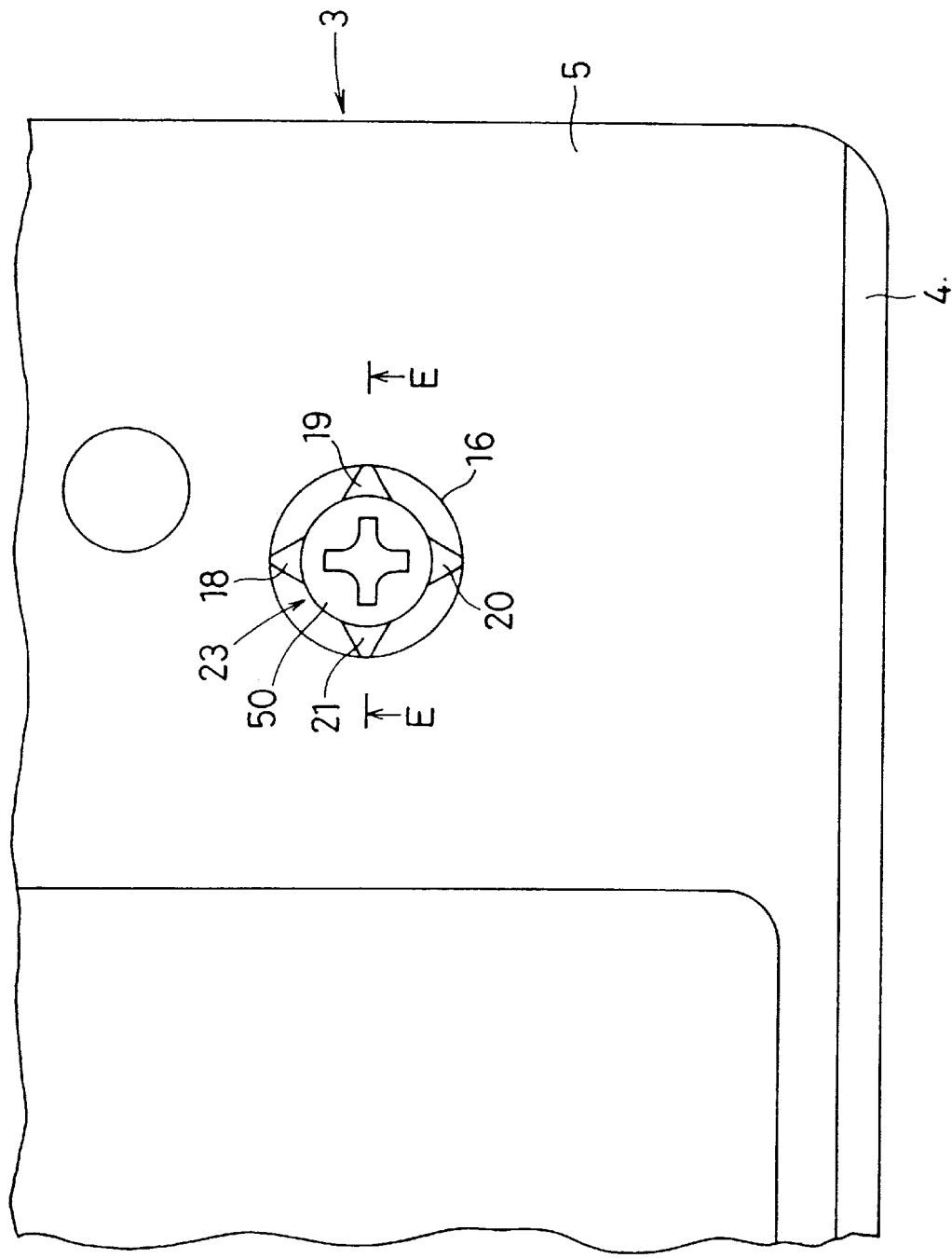
FIG. 22 is a plan view of a part of the cartridge case body, showing the stopper fitted into it.

Moreover, as shown in FIG. 18, the flange 50 has on its top surface a cross-shaped cut 51 that engages with the tip of a screwdriver having a cross-headed tip. The fitting member 48 has an outer diameter that is smaller than the inner diameter of the opening 46 of the bottom half 6, and has, as shown in FIG. 21, an axially extending engagement hole 48a having a circular cross section. The inner diameter of the engagement hole 48a is set to be large enough to allow the shaft portion 49 of case body 3 so that the lid 4 is put into a removable state.

As described above, in the third embodiment, the rotation of the stopper 23 relative to the stopper rest 17 is prevented by providing, all over the inner surface of the through hole 45 of the stopper rest 17, a plurality of vertically extending grooves 45a, and providing, all around the neck portion of the stopper body 47, a plurality of vertically extending ridges 49a formed in a shape that fits the grooves 45a so that the ridges 49a can be slid into and engaged with the grooves 45a. However, the rotation of the stopper 23 may be prevented by any other appropriate means than is described above.

For example, the ridges 49a do not necessarily need to be formed all around the neck portion of the shaft portion 49 of the stopper body 47, but may be formed only in a part or some parts of the circumference of the neck portion. Alternatively, it is also possible to form the entire shaft portion 49 in the shape of a polygon-base prism and form the through hole 45 to have a correspondingly shaped cross section so that the shaft portion 49 can be slid into and engaged with the through hole 45. Alternatively, it is also possible, by using the gaps S (see FIG. 17) that exist between the bridges 18 to 21 within the stopper removal hole 16, to design the stopper 23 to have projections that engage with the gaps S so that the engagement between those projections and the gaps S prevents the rotation of the stopper 23 relative to the stopper rest 17.

Figure 24:
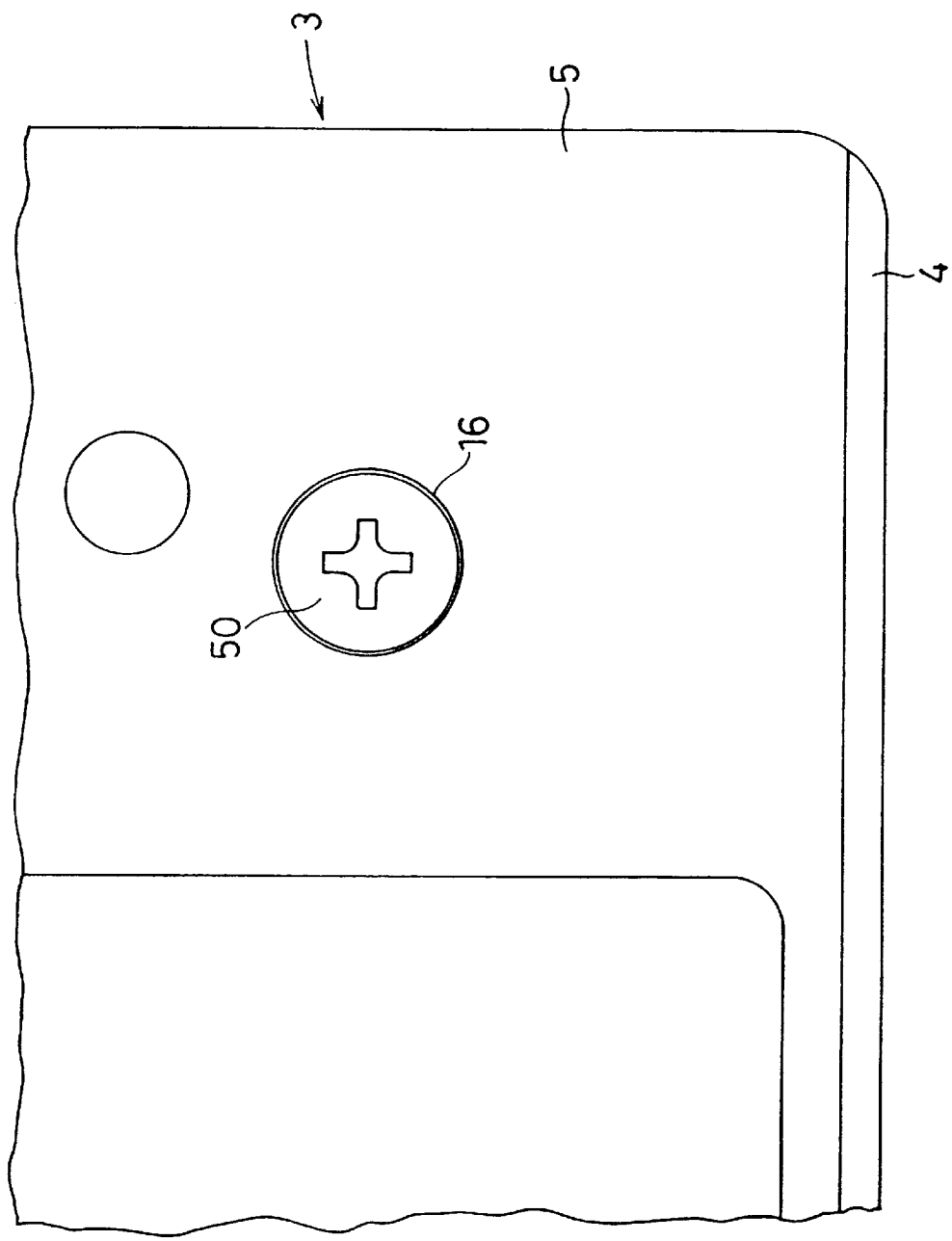
FIG. 24 is a detailed plan view of a part of a modified type of the third embodiment.

Moreover, it is also possible to fit the stopper body 47 into the fitting member 48 tightly enough to prevent the rotation of the stopper 23 relative to the stopper rest 17, or it is also possible even to fix the stopper 23 to the stopper rest 17 with adhesive or by any other fixing means. Furthermore, as shown in FIG. 24, by making the flange 50 of the stopper body 47 large enough to cover the entire entrance to the stopper removal hole 16, it is possible to prevent dust from entering the cartridge case body 3.

Figure 25:
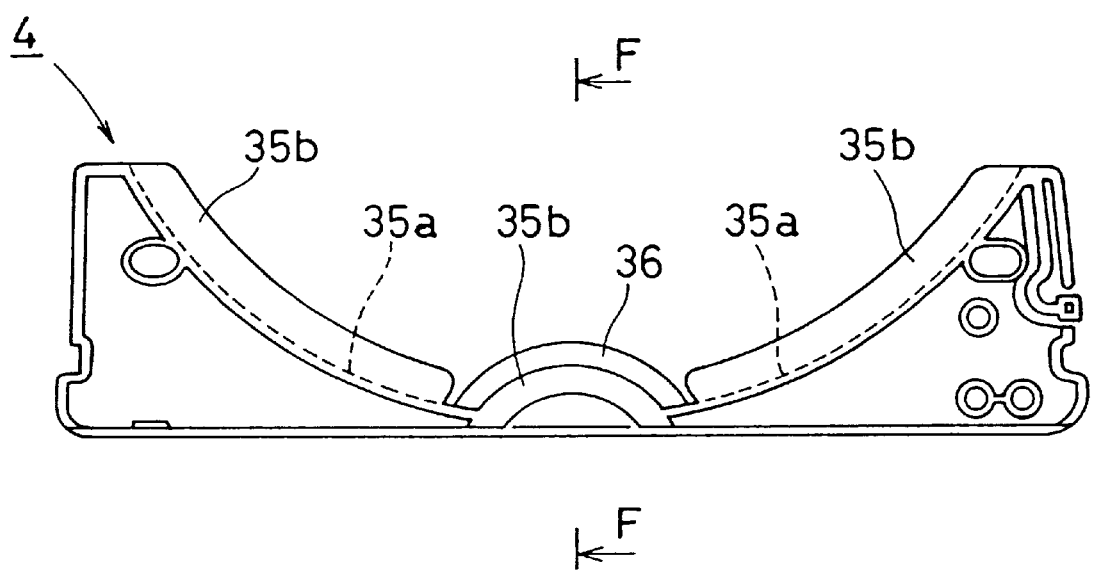
FIG. 25 is a plan view of the lid of the disk cartridge of a fourth embodiment of the invention as seen from the inside.
Figure 26:
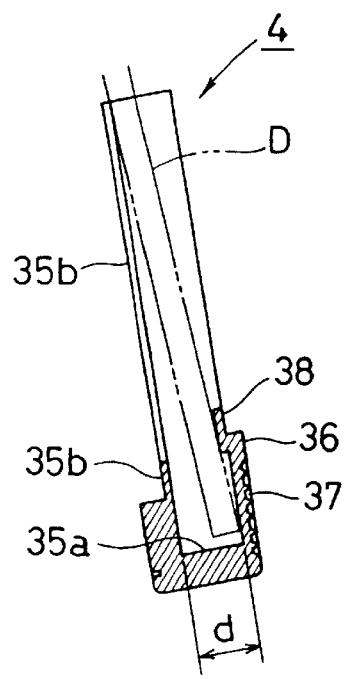
FIG. 26 is a cross section along line F—F in FIG. 25.

FIGS. 25 to 26 show distinctive portions of the disk cartridge of a fourth embodiment of the invention.

In the previous embodiments, the upper protrusion 36 is formed so as not to overlap with the lower protrusions 35b when seen from above. By contrast, in the fourth embodiment, another lower protrusion 35b is additionally formed in a position where it overlaps with the upper protrusion 36. As a result, while the lid 4 is held with its front edge pointing obliquely upward and with the disk-shaped recording medium D inserted therein, even if the recording medium D tips toward the right-hand side of FIG. 26, the recording medium D is held also at the center of the bottom-surface side of its end that is inserted into the lid 4. This helps prevent the recording medium D from falling off toward the right-hand side.

Moreover, if the lower protrusion 35b which overlaps with the upper protrusion 36 is formed into a similar shape to the latter, i.e. into a semicircular shape, it is possible to hold the disk-shaped recording medium D more stably. In this case, if a semicircular indentation is additionally formed in the rear edge of the bottom surface of the cartridge case body 3, it is possible to pull out the lid 4 with the upper and lower protrusions 36 and 35b nipped between fingers, and thus the lid 4 can be pulled out easily.

Note that it is also possible to form upper protrusions 36 also at both ends of the top side of the circumferential wall 35a, in the same way as the lower protrusions 35b shown in FIG. 10. Alternatively, it is also possible to form upper protrusions 36 only at both ends of the top side of the circumferential wall 35a, in the same way as the lower protrusions 35b shown in FIG. 14. Moreover, it is also possible to form continuous upper and lower protrusions 36 and 35b along the top and bottom sides of the circumferential wall 35a.

Figure 27:
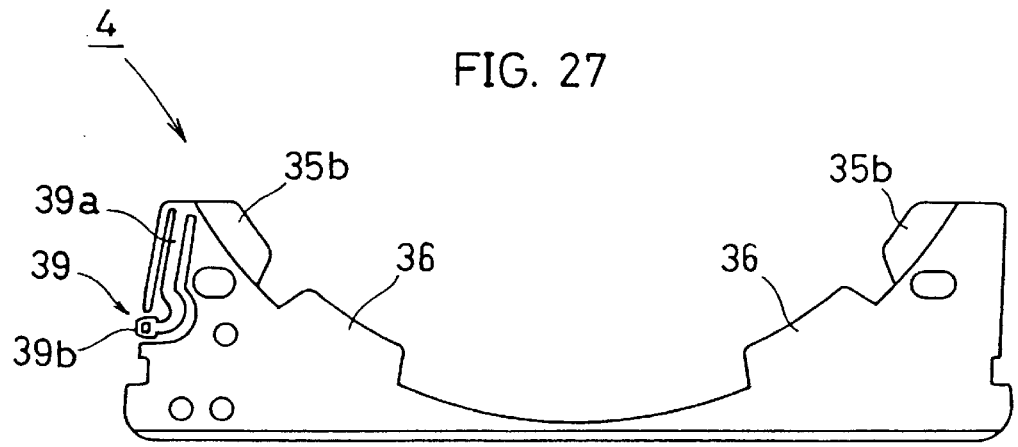
FIG. 27 is a plan view of a modified type of the lid 4.

If, as shown in FIG. 27, the upper protrusions 36 are formed only at both ends of the top side of the circumferential wall 35a, i.e. along the top side of the circumferential wall 35a except for its central portion, the top surface of the disk-shaped recording medium D contacts the upper protrusions 36 at two points, and thus it is possible to hold the recording medium stably.

It is preferable that the upper and lower protrusions 36 and 35b be formed in such a way that they contact only the unrecorded areas formed at the periphery of each surface of the disk-shaped recording medium D, because, by doing so, it is possible to prevent damage to the recording surfaces of the recording medium D.

In particular, whereas the upper protrusions 36 can be made considerably wide without the risk of damaging the recording surface of the disk-shaped recording medium D because they contact the top surface of the recording medium D only at its edge, it is preferable to set the width W of the lower protrusions 35b equal to or smaller than the width of the unrecorded area at the periphery of the recording medium D because they contact, at their edges, the bottom surface of the recording medium D at positions away from its edge.

In the embodiments described heretofore, replacement of the disk-shaped recording medium D is performed while the cartridge case body 3 is held with its opening 3a pointing obliquely downward and with an outer edge of the recording medium D inserted and held in the lid 4. However, it is also possible to perform replacement of the recording medium D by first removing the lid 4 from the cartridge case body 3 while the cartridge case body 3 is held with its front edge pointing obliquely downward and then taking out the recording medium D remaining in the cartridge case body 3 out of the cartridge case body 3 and putting another recording medium D into the cartridge case body 3 with fingers.

In this embodiment, as the lid 4 is put into and taken out of the cartridge case body 3, the disk-shaped recording medium is put into and taken out of the cartridge case body 3 together. However, the lid 4 may be designed to serve simply to close the opening of the cartridge case body 3 so that the recording medium is taken out of and put into the cartridge case body 3 manually.

A cartridge case according to the invention can be produced at lower cost, since its cartridge case body has, in its rear side, an opening through which a disk-shaped recording medium is taken out of and put into the cartridge case body in a direction parallel to the recording surfaces of the recording medium and the opening is fitted with a lid that is taken out of and put into the opening in the same direction that the recording medium is removed and inserted, and therefore, even if the cartridge case body is provided with a head access window and a drive spindle access window on each of its top and bottom sides, it does not require a shutter having a complicate structure.

A cartridge case according to the invention can prevent the lid from dropping out of the cartridge case body inadvertently, if it is provided with a locking means for locking the lid to the cartridge case body when the lid is put into the cartridge case body.

A cartridge case according to the invention which is provided with a locking means comprising a locking arm that is formed on one side edge of the lid and that comprises a bar-like resilient base portion whose one end is linked to the lid and an engagement portion that is formed at the other end of the base portion so as to protrude outward from that side edge of the lid and an engagement dent that is formed in a side wall of the cartridge case body and that engages with the engagement portion when the lid is put in the cartridge case body can more securely prevent the lid from dropping out of the cartridge case body inadvertently, if a combination of an engagement projection and an engagement groove that engage together when the lid is put into the cartridge case body is provided in another edge of the lid and in the inner surface of the side wall of the cartridge case body which faces that side of the lid.

A cartridge case according to the invention allows easy removal of the disk-shaped recording medium, if it is designed to have a lid having, in its front edge, a holding means that admits an outer edge of the disk-shaped recording medium and that holds the disk-shaped recording medium by being brought into contact with both surfaces of the disk-shaped recording medium as a result of inclination of the disk-shaped recording medium due to its own weight, and if, in addition, it is so designed that, when the lid is taken out of the cartridge case body, the recording medium automatically comes out of the cartridge case body together with the lid.

A cartridge case according to the invention which is designed to have a holding means comprising a circumferential wall that is formed in an arc shape so that it faces and fits the outer edge of the disk-shaped recording medium, an upper protrusion that is formed at an upper side of the circumferential wall so that it horizontally protrudes therefrom over the edge of the top surface of the disk-shaped recording medium, and a lower protrusion that is formed at a lower side of the circumferential wall so that it horizontally protrudes therefrom beneath the edge of the bottom surface of the disk-shaped recording medium, in order for the disk-shaped recording medium to be held by bringing the upper protrusion into contact with a top surface of the disk-shaped recording medium and bringing the lower protrusion into contact with a bottom surface of the disk-shaped recording medium contributes to the simplification of the structure of molds and thus to the reduction of the cost of the molds, if the upper protrusion is formed only in the central portion of the upper side of the circumferential wall so that the mold for forming the upper protrusion has only to have a shorter stroke in its slide core.

A cartridge case according to the invention can hold the disk-shaped recording medium stably, if it is designed to have an upper protrusion formed only in a central portion of the upper side of the circumferential wall, and if, in addition, it is designed to have a lower protrusion formed in the central portion of the lower side of the circumferential wall so that the recording medium is supported at the central portion of an outer edge of its bottom surface.

A cartridge case according to the invention can hold the disk-shaped recording medium stably, if it is designed to have upper protrusions at both ends of the upper side of the circumferential wall so that the top surface of the recording medium contacts the upper protrusions at two points.

A cartridge case according to the invention eliminates the need to use a mold having a sliding structure, and thus contributes to the reduction of the cost of molds, if it is designed to have upper and lower protrusions that do not overlap with each other when seen from above.

A cartridge case according to the invention prevents damage to the recording surfaces of the disk-shaped recording medium, and thus contributes to the prevention of write or read errors that may occur when data is written to or read from the recording medium, if it is designed to have upper and lower protrusions that contact the recording medium only in its unrecorded areas.

A disk cartridge according to the invention leaves a trace (broken bridges between the stopper rest and the inner surface of the stopper removal hole) when its user takes out the disk-shaped recording medium out of the cartridge case, since it is so designed that the recording medium cannot be taken out of the cartridge case without removing the stopper rest and the stopper by breaking the thin bridges between the stopper rest and the inner surface of the stopper removal hole.

A disk cartridge according to the invention allows easy removal of the stopper rest and the stopper, if it is so designed that the stopper rest has, on its outer surface, a cut that engages with the tip of a screwdriver.

A disk cartridge according to the invention allows the disk-shaped recording medium to be placed into the cartridge case body after the cartridge case body is formed, and thus makes it possible to flexibly cope with varying requirements of customers and different production methods, if it is designed to have, in one of its top and bottom halves, an opening that faces the stopper rest so that the stopper can be fixed to the stopper rest through the opening from outside of the cartridge case body.

A disk cartridge according to the invention eliminates the need to use adhesive, and thus is easy to handle and enhances productivity, if it is so designed that the stopper is fixed to the stopper rest by engaging one end of the stopper with the stopper rest.

A disk cartridge according to the invention which is so designed that the stopper rest has a through hole formed therethrough, that the other of the top and bottom halves has an opening that is so formed as to face the stopper rest, that the stopper consists of a stopper body composed of a shaft portion that is placed through the through hole of the stopper rest and a flange that is formed at one end of the shaft portion so as to contact a portion around the through hole on an outer surface of the stopper rest and a fitting member that engages with the shaft portion to fix the stopper body to the stopper rest, that the stopper is fixed to the stopper rest through the stopper removal hole and the opening from outside of the cartridge case body eliminates the need to use adhesive, and thus is easy to handle and enhances productivity. Moreover, the disk cartridge makes it possible to flexibly cope with varying requirements of customers and different production methods.

A disk cartridge according to the invention allows easy removal of the stopper rest and the stopper, if it is so designed that the stopper has, on the end surface of its flange, a cut that engages with the tip of a screwdriver.

A disk cartridge according to the invention helps reduce the number of parts, and thus contributes to the reduction of production cost and labor, if it is designed to have a stopper that is formed as one seamless part together with a stopper rest.

What is claimed is:

1. A cartridge case for a disk-shaped recording medium, comprising:

a cartridge case body that has a head access window and a drive spindle access window formed on at least one side thereof and that serves to hold the disk-shaped recording medium such that the disk-shaped recording medium can freely rotate therein; and a shutter that is fitted to the cartridge case body such that it can freely slide along the front edge of the cartridge case body to open and close the head access window and the drive spindle access window, wherein the catridge case body has an opening formed in its rear side so that the disk-shaped recording medium can be put into and taken out of the cartridge case body through the opening by being moved in a direction parallel to its recording surface, wherein the opening is fitted with a lid that can be put into and taken out of the opening by being moved in the direction in which the disk-shaped recording medium is put into and taken out of the cartridge case body, and wherein the lid is provided, in its front edge, with a holding means that admits an outer edge of the disk-shaded recording medium and that holds the disk-shaped recording medium by being brought into contact with both a front surface and back surface of the disk-shaped recording medium as a result of an inclination of said disk-shaped recording medium due to its own weight, and wherein the lid is capable of holding the disk-shaped recording medium for insertion into said opening of the cartridge case body.

2. A cartridge case as claimed in claim 1, wherein the cartridge case is provided with a locking means that locks the lid to the cartridge case body when the lid is put in the cartridge case body.

3. A cartridge case as claimed in claim 2, wherein the locking means comprises:
- a locking arm that is formed on one side edge of the lid and that comprises a bar-like resilient base portion whose one end is linked to the lid and an engagement portion that is formed at the other end of the base portion so as to protrude outward from that side edge of the lid; and
- an engagement dent that is formed in a side wall of the cartridge case body and that engages with the engagement portion when the lid is put in the cartridge case body.

4. A cartridge case as claimed in claim 3, wherein a combination of an engagement projection and an engagement groove that engages with the engagement projection when the lid is placed in the cartridge case body
is provided in another side edge of the lid and in the inner surface of that side wall of the cartridge case body which faces that edge.

5. A cartridge case as claimed in claim 1, wherein the holding means comprises:
- a circumferential wall that is formed in an arc shape so that it faces and fits the outer side of the disk-shaped recording medium;
- an upper protrusion that is formed at an upper side of the circumferential wall so that it horizontally protrudes therefrom over the edge of the top surface of the disk-shaped recording medium; and
- a lower protrusion that is formed at a lower side of the circumferential wall so that it horizontally protrudes therefrom beneath the edge of the bottom surface of the disk-shaped recording medium;
- wherein the disk-shaped recording medium is held by bringing the upper protrusion into contact with a top surface of the disk-shaped recording medium and bringing the lower protrusion into contact with a bottom surface of the disk-shaped recording medium.

6. A cartridge case as claimed in claim 5, wherein the upper protrusion is formed only in a central portion of the upper side of the circumferential wall.

7. A cartridge case as claimed in claim 6, wherein the lower protrusion is formed at least in a central portion of the lower side of the circumferential wall.

8. A cartridge case as claimed in claim 5, wherein the upper protrusion is formed in portions other than a central portion of the upper side of the circumferential wall.

9. A cartridge case as claimed in claim 5, wherein the lower protrusion is formed only at both ends of the lower side of the circumferential wall.

10. A cartridge case as claimed in claim 6, wherein the lower protrusion is formed only at both ends of the lower side of the circumferential wall.

11. A cartridge case as claimed in claim 5, wherein the lower protrusion is formed so as not to overlap the upper protrusion when seen from above.

12. A cartridge case as claimed in claim 5, wherein the upper and lower protrusions are formed so as to contact the disk-shaped recording medium only in unrecorded areas provided in peripheral portions of both surfaces of the disk-shaped recording medium.

13. The cartridge case for a disk-shaped recording medium of claim 1, wherein said lid is configured for holding said disk-shaped recording medium for insertion into said opening of the cartridge case body.

14. The cartridge case for a disk-shaped recording medium of claim 1, wherein said lid independently holds said disk-shaped recording medium for insertion into said opening of the cartridge case body.

15. The cartridge case for a disk-shaped recording medium of claim 1, where said lid further includes first and second projections for holding the disk-shaped recording medium, wherein said first and second projections are configured to extend generally toward said opening such that one of said first and second projections extends farther than the other.

16. The cartridge case for a disk-shaped recording medium of claim 15, wherein said inclination at least partially results from said outer edge being freely movable within said holding means.

* * * * *